(12) United States Patent
May et al.

(10) Patent No.: US 10,889,399 B2
(45) Date of Patent: Jan. 12, 2021

(54) PACKAGING SYSTEMS WITH CLIPPER TRIGGER AND RESET CAM ASSEMBLIES EACH COMPRISING A PLURALITY OF CAMS AND RELATED CAM ASSEMBLIES

(71) Applicant: Tipper Tie, Inc., Apex, NC (US)

(72) Inventors: Dennis J. May, Pittsboro, NC (US); Samuel D. Griggs, Apex, NC (US); William M. Poteat, Fuquay Varina, NC (US); Matthew D. Lowder, Durham, NC (US)

(73) Assignee: Tipper Tie, Inc., Apex, NC (US)

( * ) Notice: Subject to any disclaimer, the term of this patent is extended or adjusted under 35 U.S.C. 154(b) by 351 days.

(21) Appl. No.: 15/792,977

(22) Filed: Oct. 25, 2017

(65) Prior Publication Data

US 2018/0118394 A1 May 3, 2018

Related U.S. Application Data

(60) Provisional application No. 62/414,220, filed on Oct. 28, 2016.

(51) Int. Cl.
*B65B 51/04* (2006.01)
*B65B 25/00* (2006.01)
(Continued)

(52) U.S. Cl.
CPC ............ *B65B 51/04* (2013.01); *A22C 11/125* (2013.01); *B65B 9/2056* (2013.01); *B65B 25/001* (2013.01); *B65B 47/02* (2013.01); *B65B 57/00* (2013.01); *B65B 61/04* (2013.01); *B65B 65/02* (2013.01); *B29C 31/002* (2013.01); *B29C 53/50* (2013.01); *B65B 9/22* (2013.01); *B65B 51/28* (2013.01); *B65B 59/04* (2013.01); *F42B 1/00* (2013.01); *F42B 39/00* (2013.01); *F42B 39/20* (2013.01)

(58) Field of Classification Search
CPC ....... B29C 31/002; B29C 53/50; B65B 57/00; B65B 51/04; B65B 51/046; B65B 9/12; A22C 11/12; A22C 11/125
See application file for complete search history.

(56) References Cited

U.S. PATENT DOCUMENTS

| 4,821,485 | A | 4/1989 | Evans et al. |
| 5,020,298 | A * | 6/1991 | Evans ................... A22C 11/108 29/243.57 |
| 5,085,036 | A | 2/1992 | Evans et al. |
| 5,203,760 | A | 4/1993 | Chen et al. |
| 5,259,168 | A | 11/1993 | Evans et al. |
| 5,471,815 | A | 12/1995 | Evans et al. |

(Continued)

*Primary Examiner* — Andrew M Tecco
*Assistant Examiner* — Nicholas E Igbokwe
(74) *Attorney, Agent, or Firm* — Christensen O'Connor Johnson Kindness PLLC

(57) ABSTRACT

Packaging systems with a rotatable table top held by a rotatable column, a plurality of circumferentially spaced apart clipper assemblies held at respective clipper stations provided by the rotatable table top, plurality of spaced apart pneumatic valves under the table top in fluid communication with the clipper assemblies, and at least one of: (a) a clipper reset cam assembly held under the rotatable table top with first and second reset cams cam that selectively automatically engage the pneumatic valves as the table rotates; and (b) a clipper trigger cam assembly held under the rotatable table top circumferentially spaced apart from the clipper reset cam assembly with first and second trigger cams that selectively automatically engage the pneumatic valves as the table rotates.

11 Claims, 21 Drawing Sheets

(51) Int. Cl.

| | |
|---|---|
| *B65B 47/02* | (2006.01) |
| *B65B 61/04* | (2006.01) |
| *B65B 9/20* | (2012.01) |
| *B65B 9/22* | (2006.01) |
| *B65B 57/00* | (2006.01) |
| *A22C 11/12* | (2006.01) |
| *B65B 65/02* | (2006.01) |
| *F42B 39/00* | (2006.01) |
| *B29C 31/00* | (2006.01) |
| *B29C 53/50* | (2006.01) |
| *B65B 51/28* | (2006.01) |
| *B65B 59/04* | (2006.01) |
| *F42B 1/00* | (2006.01) |
| *F42B 39/20* | (2006.01) |

(56) References Cited

U.S. PATENT DOCUMENTS

| | | | |
|---|---|---|---|
| 5,495,701 | A | 3/1996 | Poteat et al. |
| 5,586,424 | A | 12/1996 | Chen et al. |
| 5,644,896 | A | 7/1997 | Evans et al. |
| 6,920,738 | B2 | 7/2005 | Wilkins et al. |
| 8,006,463 | B2 * | 8/2011 | May .................... A22C 11/125 53/138.4 |
| 2009/0158688 | A1 * | 6/2009 | May ........................ B65B 9/20 53/138.2 |
| 2011/0232238 | A1 * | 9/2011 | May ...................... B65B 25/064 53/473 |
| 2011/0281706 | A1 * | 11/2011 | May ........................ B65B 9/20 493/150 |
| 2015/0128524 | A1 * | 5/2015 | Chen .................... A22C 11/125 53/138.2 |
| 2017/0129636 | A1 * | 5/2017 | Chen ....................... B65B 59/00 |

* cited by examiner

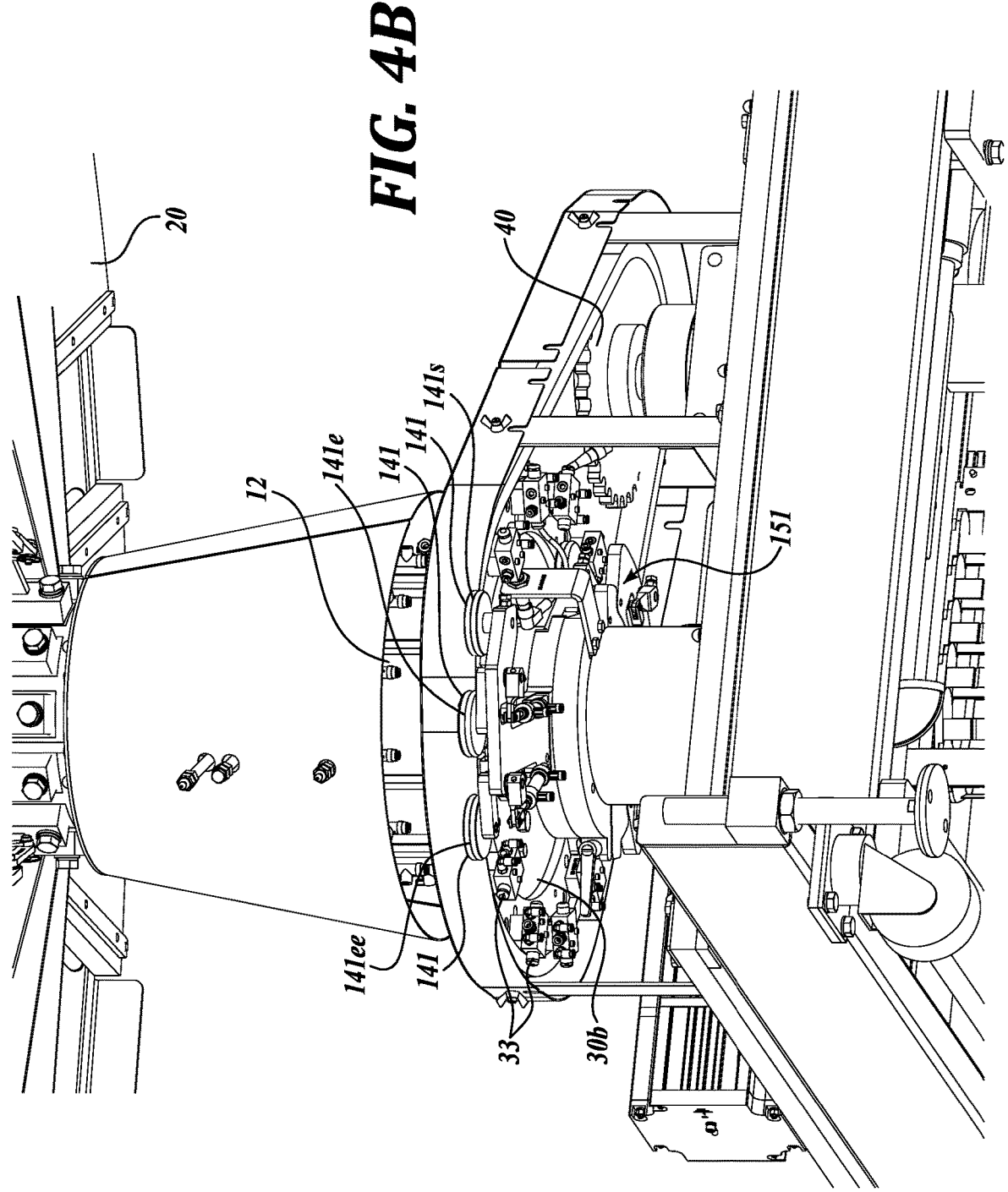

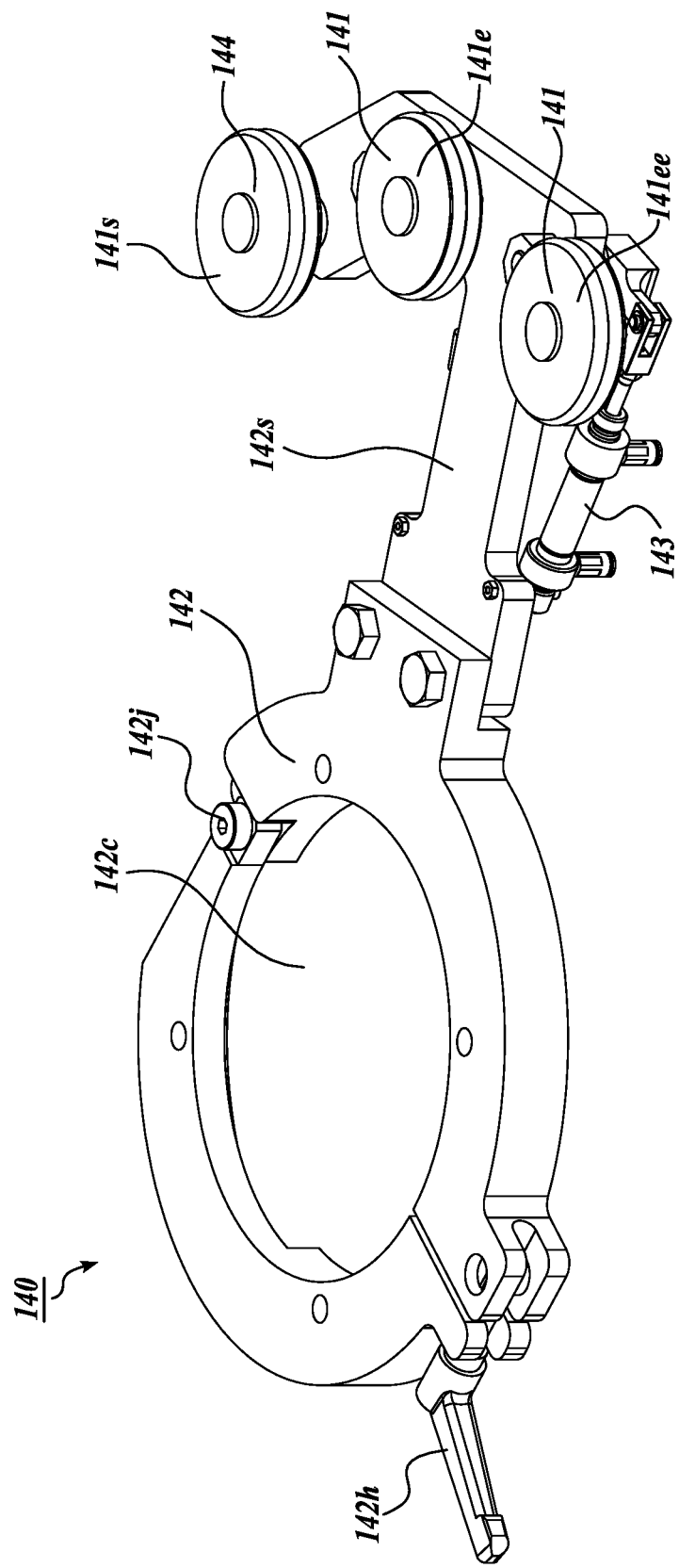

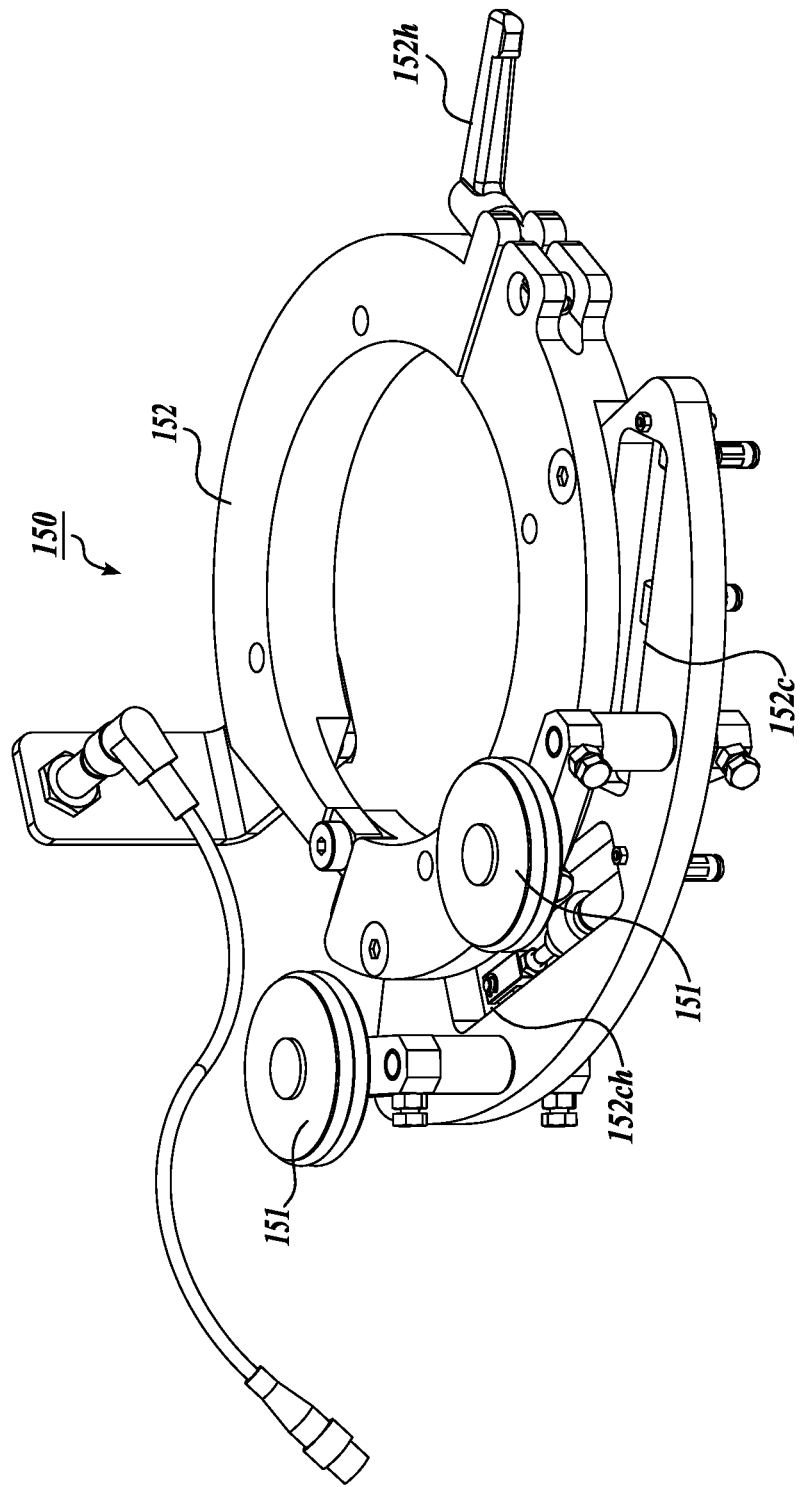

PACKAGING SYSTEMS WITH CLIPPER TRIGGER AND RESET CAM ASSEMBLIES EACH COMPRISING A PLURALITY OF CAMS AND RELATED CAM ASSEMBLIES

FIELD OF THE INVENTION

The present invention relates to clipper assemblies for packaging systems.

BACKGROUND OF THE INVENTION

Conventionally, in the production of goods such as, for example, explosives, meat or other products, the product is fed (typically pumped) or stuffed into a casing in a manner that allows the casing to fill with a desired amount of the product. As is well-known, the casings can be a slug-type natural or artificial casing that unwinds, advances, stretches and/or pulls to form the elongate casing over the desired product. Another type of casing is a heat-sealed tubular casing formed by seaming together a thin sheet of flexible material, typically elastomeric and/or polymeric material. U.S. Pat. Nos. 5,085,036 and 5,203,760 describe examples of automated substantially continuous-feed devices suitable for forming sheet material or flat roll stock into tubular film casings.

Rotating multi-clipper platform systems, such as the Rota-Clip® high speed packaging system by Tipper Tie, Apex, N.C., have been used to produce increased quantities of clipped product. See, e.g., U.S. Pat. Nos. 4,821,485; 5,020,298; 5,259,168; 5,471,815; 5,644,896 and 8,006,463. The contents of these patents are hereby incorporated by reference as if recited in full herein.

SUMMARY OF EMBODIMENTS OF THE INVENTION

Embodiments of the invention are directed to packaging systems that include a rotatable table top held by a rotatable column; a plurality of circumferentially spaced apart clipper assemblies held at respective clipper stations of the rotatable table top; a plurality of spaced apart pneumatic valves under the table top in fluid communication with the clipper assemblies; and at least one of: (a) a clipper reset cam assembly held under the rotatable table top with first and second reset cams cam that selectively automatically engage the pneumatic valves as the table rotates; or (b) a clipper trigger cam assembly held under the rotatable table top with first and second trigger cams that selectively automatically engage the pneumatic valves as the table rotates.

The system can include the clipper reset cam assembly or the clipper reset cam assembly and the clipper trigger ca, assembly. The first and second reset cams can be reset standard and reset early cams. The reset early cam can open a gate of the clipper earlier than the reset standard cam.

The system can include a sprocket with an inner perimeter and an outer perimeter. The inner perimeter can surrounds the rotatable column under the rotatable table. The plurality of spaced apart pneumatic valves can be held by and under the sprocket.

The system can include the clipper reset cam assembly or the clipper reset cam assembly and the clipper trigger cam assembly. The clipper reset cam assembly can include a third reset cam. The first reset cam can be held at a forwardmost location relative to a rotational direction of the table and/or downstream of the second and third reset cams. The first, second and third reset cams can all face the rotatable column adjacent the outer perimeter of a sprocket.

The system can include the clipper trigger cam assembly or the clipper reset cam assembly and the clipper trigger cam assembly. The first and second trigger cams can be trigger standard and trigger early cams and the trigger early cam can initiate a clipping cycle earlier than the trigger standard cam.

The system can include the clipper reset cam assembly and the clipper trigger cam assembly. The system can also include a sprocket with an inner perimeter and an outer perimeter. The inner perimeter can surround the rotatable column under the rotatable table. The plurality of spaced apart pneumatic valves can be held by the sprocket. The plurality of spaced apart pneumatic valves can include a first actuator contact segment that faces outward and a second actuator contact segment that faces inward. The clipper reset cam assembly can position the first and second reset cams adjacent the outer perimeter of the sprocket with at least a portion of the first and second reset cams extending a distance beyond the outer perimeter of the sprocket. The clipper trigger cam assembly can positions the first and second trigger cams between the inner and outer perimeter of the sprocket, circumferentially offset from the reset cam assembly.

The system can include the clipper reset cam assembly and the clipper trigger cam assembly. The first reset cam can be a reset standard cam and the first trigger cam can be a trigger standard cam. Center lines of the reset standard and trigger standard cams can be separated by an angle $\gamma$ that is from 100-180 degrees.

The system can include the clipper trigger cam assembly or the clipper reset cam assembly and the clipper trigger cam assembly. The system can further include a sprocket with an inner perimeter and an outer perimeter. The inner perimeter surrounds the rotatable column under the rotatable table top. The plurality of spaced apart pneumatic valves can be held by the sprocket. The clipper trigger cam assembly can include a proximity sensor and at least one actuator that can be attached to at least one of the first and second trigger cams. The at least one actuator and the proximity sensor can reside between the inner and outer perimeters of the sprocket.

The system can include the clipper reset cam assembly and the clipper trigger cam assembly. The system can further include sprocket with an inner perimeter and an outer perimeter. The inner perimeter can surrounds the rotatable column under the rotatable table. The plurality of spaced apart pneumatic valves can be held by the sprocket. The clipper reset cam assembly can include at least one actuator that is attached to at least one of the first and second trigger cams. The at least one actuator can reside outside the outer perimeter of the sprocket.

The reset cams and/or the trigger cams can be cam wheels that may have external circumferentially extending grooves holding at least one O-ring to protrude out of the groove.

The cams wheels can have an outer diameter of between 1 and 3 inches.

The system can include both the clipper reset cam assembly and the clipper trigger cam assembly. The system can further include: a sprocket with an inner perimeter and an outer perimeter. The inner perimeter can surround the rotatable column under the rotatable table. The plurality of spaced apart pneumatic valves can be held by the sprocket, optionally with centerlines of a reset standard cam as the first reset cam and a trigger standard cam as the first trigger cam being spaced apart between 100-220 degrees, measured relative to a centerline of the sprocket. The system can also include a drive system with a chain or belt that is attached to the outer perimeter of the sprocket that rotates the column and the table top; and a control circuit in communication with the clipper trigger cam assembly and the clipper reset cam assembly. The control circuit can be configured to monitor rotation speed of the column, and selectively and automatically activate or deactivate (i) one of the first or second trigger cams and (ii) one of the first or second reset cams when the column has a speed above and below selected or defined speed thresholds.

The system can include the clipper reset cam assembly and the clipper trigger cam assembly, and wherein the system can also include a sprocket with an inner perimeter and an outer perimeter. The inner perimeter can surround the rotatable column under the rotatable table top. The plurality of spaced apart pneumatic valves can be held by the sprocket. The system can also include a drive system with a chain or belt that is attached to the outer perimeter of the sprocket that rotates the column and the table top; and a control circuit in communication with the clipper trigger cam assembly and the clipper reset cam assembly, the control circuit configured to monitor rotational speed of the column. The control circuit can direct the clipper assemblies to operate on a synchronized clipping cycle that includes electronically automatically: (i) opening a gate valve to move a gate to a closed position using either a trigger standard cam or a selectively activating a trigger early cam, respectively corresponding to the first and second trigger cams; (ii) confirming if a voider plate is in position; (iii) if so, activating a punch valve to move a punch cylinder to drive a punch downward to punch a clip over a target product at the clip die; (iv) directing a knife cylinder to move a knife to cut a clipped package; and (v) opening the gate using either a reset standard cam or a selectively activated reset early cam, respectively corresponding to the first and second reset cams, while retracting the knife cylinder and the punch cylinder.

Other embodiments are directed to methods of adjusting automatic clip cycles of clippers held by a rotating table. The methods include: electronically monitoring a rotating table speed of the table; automatically operating pneumatic valves in fluid communication with respective clippers using a trigger standard or trigger early cam depending on the monitored table speed; and automatically operating the pneumatic valves using one of a reset early or reset standard cam depending on the monitored table speed.

The pneumatic valves can be held on a rotating sprocket that rotates the table. The cam assemblies typically do not rotate with the table and the trigger early and reset early cams can be connected to actuators that extend and retract the cam from an operative to an inoperative position relative to the pneumatic valves.

The method can further include electronically determining if the monitored table speed is at or above a first speed threshold to selectively activate or deactivate the trigger early cam and/or the reset early cam.

Still other embodiments are directed to A clipper trigger cam assembly that includes: a bracket assembly comprising first and second spaced apart cams, the first cam being a trigger standard cam and the second cam being a trigger early cam that triggers a clip cycle to start earlier than a clip cycle initiated by the trigger standard cam.

The clipper trigger cam assembly can include at least one actuator held by the bracket assembly that has an end portion that is attached to the trigger standard cam and/or trigger early cam and pivots the trigger standard cam and/or the trigger early cam into an operative position from a home position.

The bracket assembly can have cooperating arcuate members that attach together and define a center circular open longitudinally extending channel.

The first and second cams can have an outer diameter of from about 1 to about 3 inches and can have an outer surface with grooves that hold respective O-rings therein. The O-rings can project out from the outer diameter of the cams.

The clipper trigger cam assembly can also include first and second actuators held by the bracket assembly. The first actuator can be attached to the trigger standard cam and the second actuator can be attached to the trigger early cam. The first actuator can selectively pivot the trigger standard cam between operative and home positions and the second actuator can selectively pivot the trigger early cam between operative and home positions.

The clipper trigger cam assembly can include an upright bracket that is attached to the bracket assembly that holds a proximity switch facing radially inward.

Still other embodiments are directed to clipper reset cam assemblies that include a bracket assembly with first and second spaced apart cams, the first cam being a reset standard cam and the second cam being a reset early cam that causes a gate to close earlier than the reset standard cam.

The clipper reset cam assembly can also include at least one actuator held by the bracket assembly that has an end portion that is attached to the reset standard cam and/or reset early cam and pivots the reset standard cam and/or the reset early cam between operative and inoperative positions.

The bracket assembly can have cooperating arcuate members that attach together and define a center circular open longitudinally extending channel.

The clipper reset cam assembly can include a third reset cam held by the bracket assembly. The first reset cam can be held at a forwardmost location relative to a rotational direction of a table holding clippers and/or downstream of the second and third reset cams.

The cams can have an outer diameter of from about 1 inch to about 3 inches and an outer surface with grooves that hold respective O-rings therein. The O-rings can project out from the outer diameter of the cams.

The clipper reset assembly can further include a third reset cam held by the bracket assembly and may also include first and second actuators attached to the bracket assembly. The first actuator can be attached to the second reset cam. The second actuator can be attached to the third reset cam. The first reset cam can be held in a fixed position by the bracket assembly.

Still other embodiments are directed to packaging systems that include: a table held by a rotatable column; a plurality of circumferentially spaced apart clipper assemblies held at respective clipper stations of the rotatable table top; a sprocket with an inner perimeter and an outer perimeter, wherein the inner perimeter surrounds the rotatable column under the table, a plurality of spaced apart pneumatic valves held by and under the sprocket; and a clipper reset cam assembly held under the rotatable table with first and second reset cams cam that selectively automatically engage the pneumatic valves as the table rotates.

The system can also include a support disk attached to a bottom of the sprocket that holds the clipper gate reset cam assembly.

The first and second reset cams can extend at least partially outside the outer perimeter of the sprocket.

The system can include a clipper trigger cam assembly held under the sprocket circumferentially spaced apart from the clipper gate reset cam assembly with first and second trigger cams that selectively automatically engage the pneumatic valves as the table rotates.

The first and second reset cams can be reset standard and reset early cams and the reset early cam can open a gate of the clipper earlier than the reset standard cam.

The clipper reset assembly can also include a third reset cam. The first reset cam can be held at a forwardmost location relative to a rotational direction of the table and/or downstream of the second and third reset cams. The first, second and third reset cams can all face inwardly toward the outer perimeter of the sprocket.

The first and second trigger cams can be trigger standard and trigger early cams and the trigger early cam can initiate a clipping cycle earlier than the trigger standard cam.

The pneumatic valves comprise a first actuator contact segment that faces outward and a second opposing actuator contact segment that faces inward. The clipper reset cam assembly can position the first and second reset cams adjacent the outer perimeter of the sprocket with at least a portion of the first and second reset cams extending a distance beyond the outer perimeter of the sprocket.

The clipper trigger cam assembly can position the trigger cams between the inner and outer perimeter of the sprocket, circumferentially offset from the reset cam assembly.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

These and other objects and/or aspects of the present invention are explained in detail in the specification set forth below.

BRIEF DESCRIPTION OF THE DRAWINGS

FIGS. 4A-1, 4A-2, and 4A-3 are partial exploded views of a portion of a rotating table multi-clipper packaging system according to embodiments of the present invention.

FIG. 4B is an enlarged partial assembly view of the portion of the system shown in FIGS. 4A-1, 4A-2, and 4A-3 according to embodiments of the present invention.

FIG. 7B is a bottom perspective assembled view (oriented to face the sprocket) of the reset cam assembly shown in FIG. 7A.

FIG. 8C is another side perspective assembled view of the trigger cam assembly shown in FIG. 8A.

DETAILED DESCRIPTION OF EMBODIMENTS OF THE INVENTION

Figure 1:
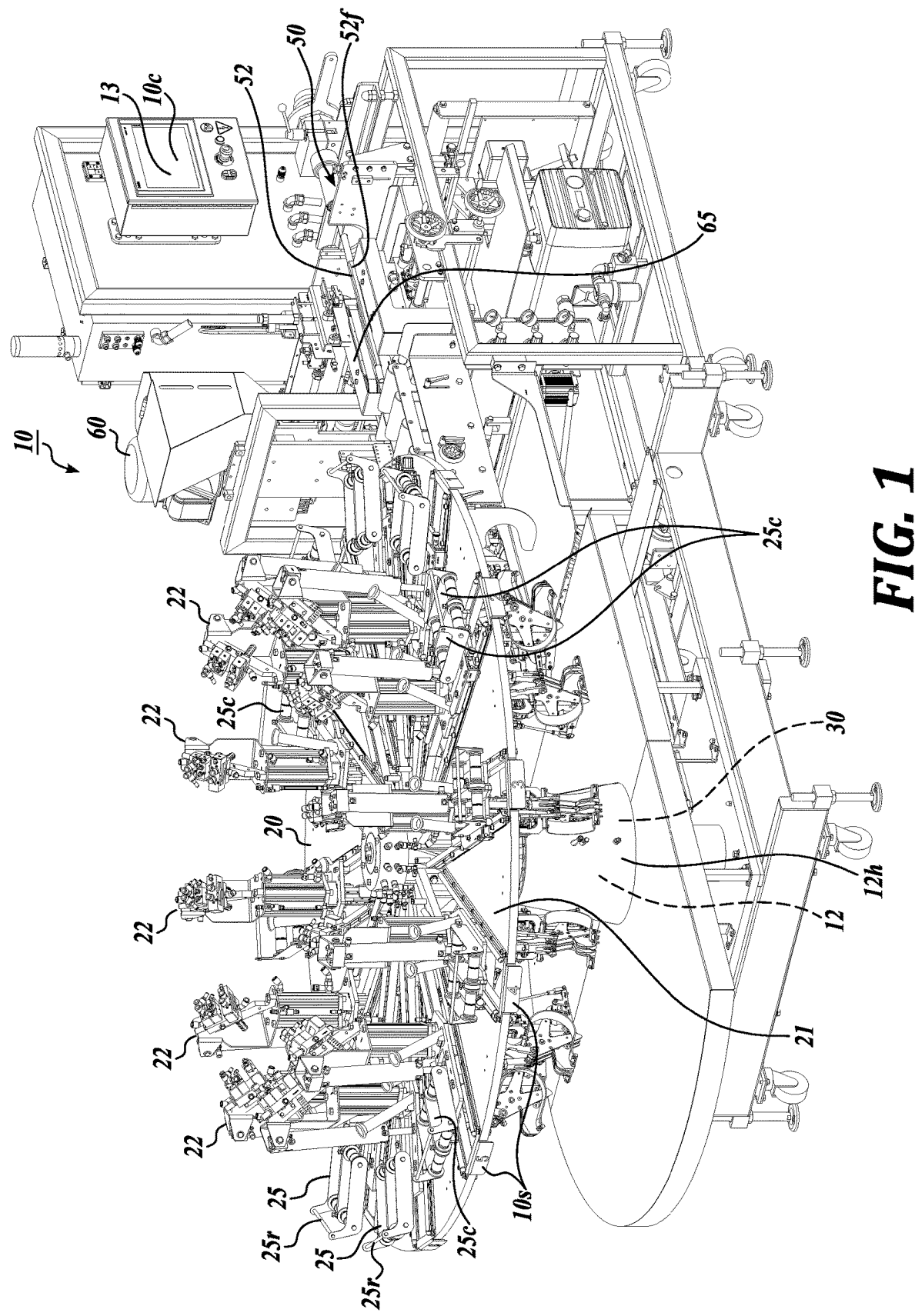
FIG. 1 is a top, side perspective view of a packaging system according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. Features described with respect to one embodiment may be used alone or with another embodiment although not specifically described with respect to that other embodiment.

In the figures, certain layers, components or features may be exaggerated for clarity, and broken lines illustrate optional features or operations unless specified otherwise. In addition, the sequence of operations (or steps) is not limited to the order presented in the claims unless specifically indicated otherwise. Abbreviated versions of the word "Figure" such as "FIG." and "Fig." are used interchangeably with the word "Figure" in the application.

The term "concurrently" means that the operations are carried out substantially simultaneously.

The term "about" means that the noted value can vary by +/−20%.

It will be understood that when a feature, such as a layer, region or substrate, is referred to as being "on" another feature or element, it can be directly on the other element or intervening elements may also be present. In contrast, when an element is referred to as being "directly on" another feature or element, there are no intervening elements present. It will also be understood that, when a feature or element is referred to as being "connected", "attached" or "coupled" to another feature or element, it can be directly connected to the other element or intervening elements may be present. In contrast, when a feature or element is referred to as being "directly connected", "directly attached" or "directly coupled" to another element, there are no intervening elements present. The phrase "in communication with" refers to direct and indirect communication. Although described or shown with respect to one embodiment, the features so described or shown can apply to other embodiments.

The term "circuit" refers to software embodiments or embodiments combining software and hardware aspects, features and/or components, including, for example, at least one processor and software associated therewith embedded therein and/or executable by and/or one or more IC (Integrated Circuit) or Application Specific Integrated Circuits (ASICs), for programmatically directing and/or performing certain described actions, operations or method steps. The circuit can reside in one location or multiple locations, it may be integrated into one component or may be distributed, e.g., it may reside entirely in a workstation or single computer, partially in one workstation, cabinet, or computer, or totally in a remote location away from a local display at a workstation. If the latter, a local computer and/or processor can communicate over a LAN, WAN and/or internet to transmit data and/or control signals and the like.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. Like numbers refer to like elements throughout. In the figures, the thickness of certain lines, layers, components, elements or features may be exaggerated for clarity. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "frame" means a generally skeletal structure used to support one or more assemblies, modules and/or components. The frame can be a floor mount frame. The term "automated" means that operations can be carried out substantially without manual assistance, typically using programmatically directed control systems and electrical and/or mechanical devices. The term "semi-automatic" means that operator input or assistance may be used but that most operations are carried out automatically using electromechanical devices and programmatically directed control systems.

In the description of embodiments of the present invention that follows, certain terms are employed to refer to the positional relationship of certain structures relative to other structures. As used herein, the term "front" or "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward" and "upstream" and derivatives thereof refer to the directions opposite, respectively, the forward and downstream directions.

The terms "adhesive" or "glue" means a material that when applied to a seam or overlying edge portions of a covering or casing material can adhere the edges to seal the product (typically in a substantially tubular or elongate shape). The seal is typically strong and is able to withstand desired pressures. For food products, the adhesive can be biocompatible. Examples of suitable adhesives include, but are not limited to, polymers such as melted HDPE (high density polyethylene).

Embodiments of the present invention are particularly suitable for producing encased products that cooperate with clippers to apply clips to seal products held in the casings. The product may be a linked chain of elongated extruded product held in a casing. The casing or covering can be any suitable material or materials (edible or inedible, natural or synthetic) such as, but not limited to, collagen, cellulose, elastomeric, polymeric and/or plastic casing. The term "film" refers to a thin flexible sheet of covering material. When used with food products, the film, casing or covering should be food-compatible.

Referring now to FIGS. 1 and 2A, 2B and 2C, the packaging system 10 includes a rotating table or platform 20 with a table top 21. The packaging system 10 comprises a plurality of circumferentially spaced apart clipper stations 10s with respective clippers 22 (which can optionally be double clippers) and clip spool mount assemblies 25 that hold spools of clips 28 fed to the clippers 22. The lower end of each clipper 22 resides under the table top 21 and tubular product is held under the rotating table top 21 during production where the clips from the clip spools are applied by the clippers (which can also be interchangeable referred to as "clipper assemblies") 22 and end portions of the tubular product are clipped and cut into separate pieces.

FIG. 1 illustrates a spool mount assembly 25 that has at least one spool cavity 25c (also called a "cradle"), typically two side-by-side spool cavities for double clipper operation. When assembled, the spool mount assembly 25 can releasably hold a spool of clips 28 (FIG. 2A) in a respective cavity 25c at respective clipper stations 10s. Optionally, the spool mount assembly 25 can include at least one laterally extending retainer shaft 25r that, in position, faces the outer perimeter of the table 20 (in a direction away from the clipper and table center). The retainer shaft 25r can be of any suitable size and shape. The retainer shaft 25r can be configured to trap/retain the spool 28 in the cavity 25c of the spool assembly 25 during rotation when exposed to centrifugal forces that might otherwise eject the spools from the spool mount assembly 25 when the spool mount assembly is located at an outer portion of the table (e.g., the position shown in FIG. 1), at certain rotational speeds and/or acceleration, particularly when used to produce certain longer length products, e.g., at a rotational speed of between about 20 rotations per minute (rpm) to about 35 rpm, including between 25 rpm to about 33⅓ rpm. In some embodiments, at 29 rpm, the system 10 can produce 350 pieces per minute (ppm), typically using 12 active clippers. In some embodiments, the system 10 can produce about 400 ppm at 33⅓ rpm.

Figure 2A:
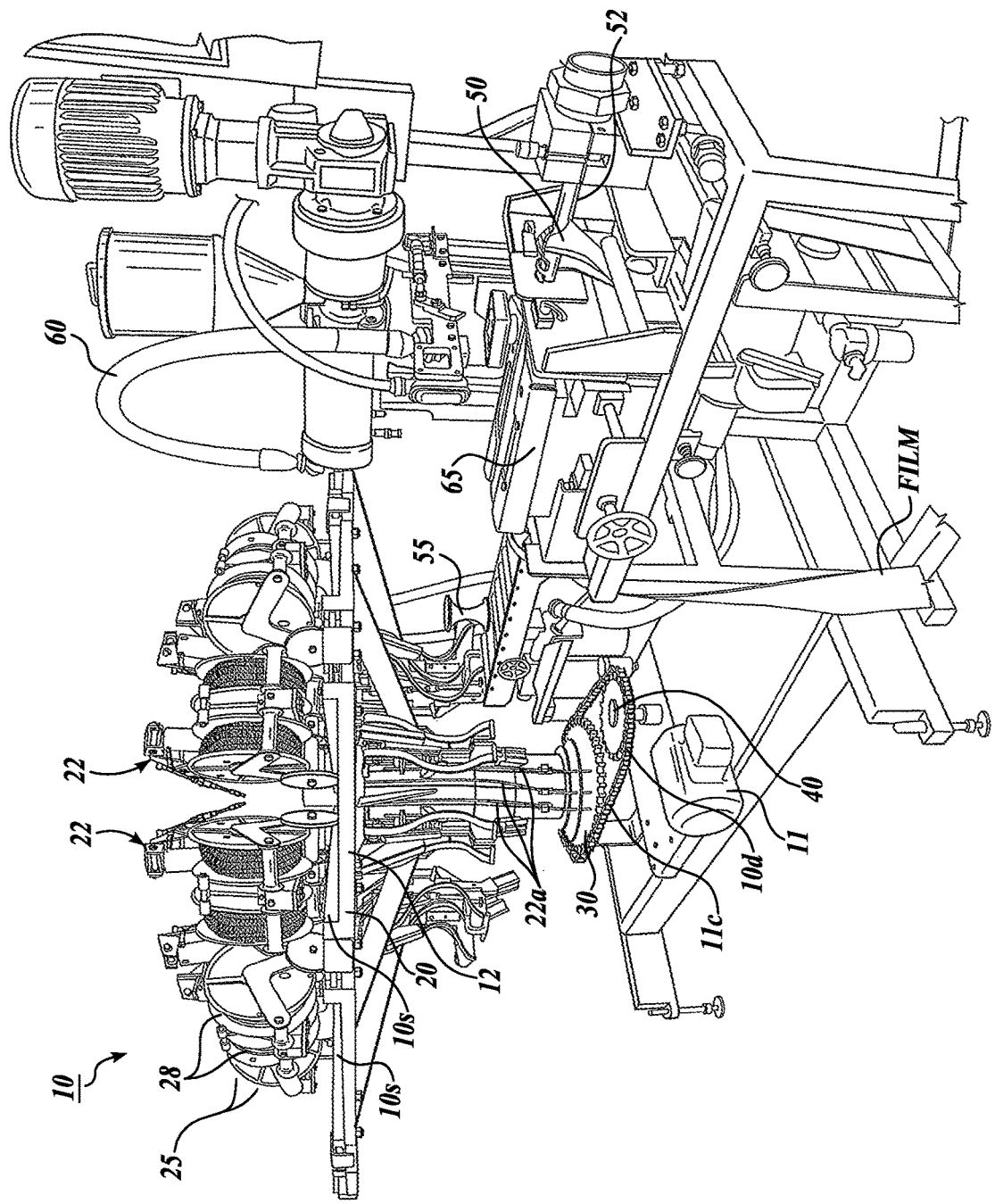
FIG. 2A is a side perspective view of a similar packaging system shown in FIG. 1 but with certain housing components omitted and with clip spools held in the clip cradles according to embodiments of the present invention.

A center column 12 rotates the table 20 and is shown as held under an optional cylindrical housing 12h in FIG. 1. FIG. 1 also illustrates an optional product tray 10t over a drive system 10d that comprises a sprocket 30 held a distance beneath the table top 21. FIG. 2A shows the drive system 10d with the sprocket 30 held about the column 12 and a motor 11 that engages the drive gear 40 that rotates a drive belt and/or chain 11c to rotate the sprocket 30 that then rotates the table 20. The drive system 10d may not require a sprocket and may use other drive systems to rotate the column 12 and/or table 20.

Figure 2B:
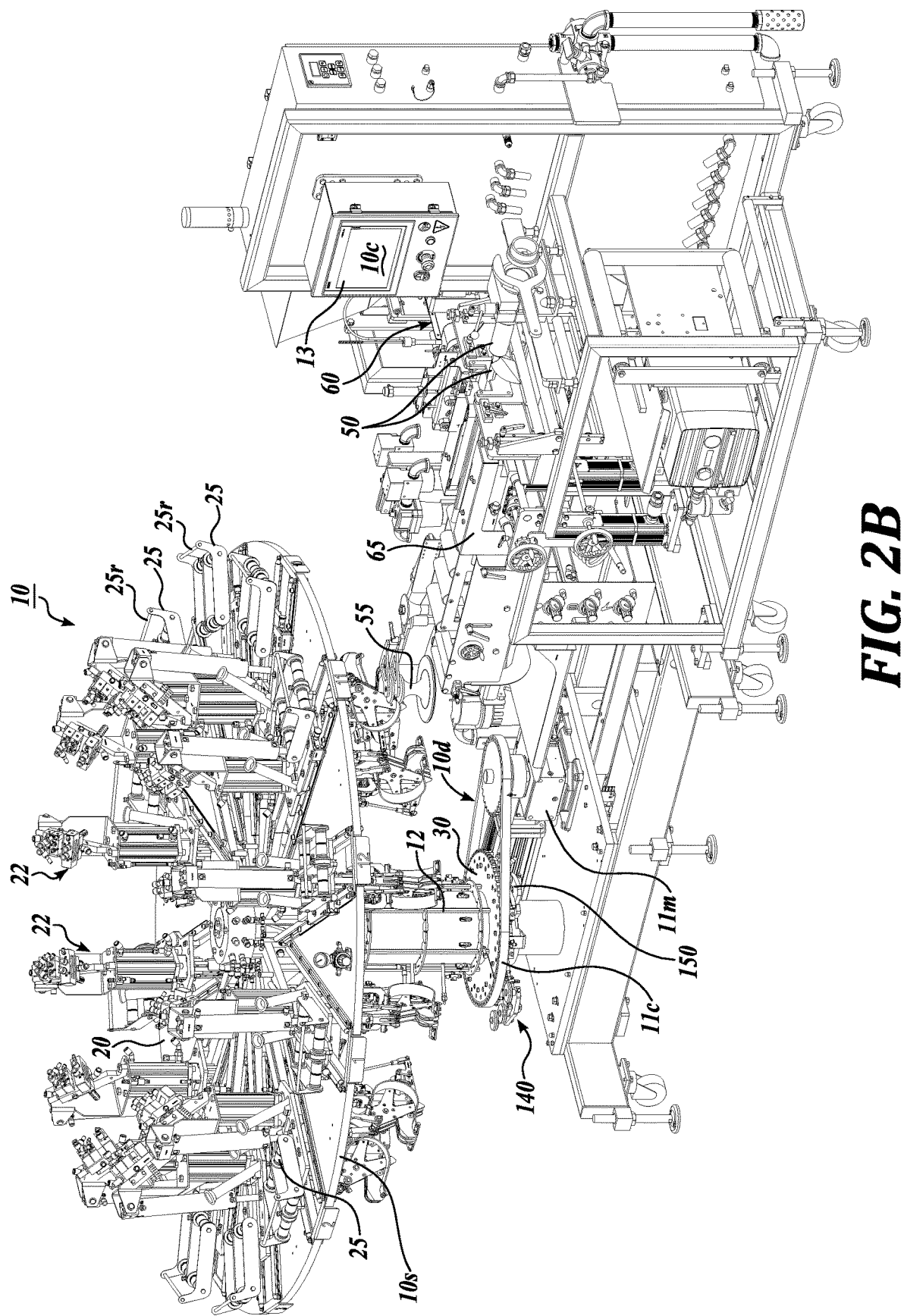
FIG. 2B is another side perspective view of the packaging system shown in FIG. 1, sans housing covers according to embodiments of the present invention.

Although shown in FIGS. 1, 2A and 2B as including twelve clippers 22, not all need be operational during a packaging operation (e.g., alternating or select ones can be deactivated), or the table 20 may include other numbers of clippers 22, typically between 10-14. Conventional Rota-Clip® systems are available from Tipper Tie, Apex, N.C. The number of clippers 22 used in combination with the circumference of the table 20, and/or the radially adjusted position of the clippers 22 on the table 20 can allow for different lengths of end product to be produced. For example, for the same clipper radial positions, one operation using all twelve clippers 22 can produce a six-inch product. If every other clipper 22 is deactivated, up to a 36 inch product can be used. Larger sizes can be achieved using alternate configurations.

Still referring to FIGS. 1 and 2A and 2B, the packaging system 10 may also include a controller 10c with an HMI and/or display 13, a film drive assembly 65 that is positioned about a product horn 52, a flowable adhesive fluid supply and delivery path 60, and a forming collar 50.

As is well known to those of skill in the art, the forming collar 50 is configured to form sealed (seamed) substantially tubular casings from an elastomeric and/or polymeric sheet and/or planar roll stock ("flat roll stock") that is then stuffed or filled with flowable product. More typically, the flat roll stock is an elastomeric and/or polymeric sheet that is relatively thin. The flat roll stock can be flat sheet stock of a flexible film that can be formed in situ into a continuous length of heat-sealed and/or otherwise joined or seamed tubular casing. The forming can be carried out substantially automatically and continuously over a desired interval (typically between at least about 45-60 minutes, depending on the size of the length of the roll stock). The seaming can be performed using a hot-melt flowable material, such as a polymer, as the adhesive that seals two layers together. The seaming can use additional and/or other suitable sealing means, including, for example, ultrasonic, light (ultraviolet or other desired wavelength), chemical, and/or other sealing means. The seam can be a flat seam, a fin seam, or other overlapping and/or abutting joint configuration, but is typically formed with one long edge of the casing and/or film overlapping the other.

The horn (also known as a "sizing mandrel") may have an external surface with a plurality of circumferentially spaced apart adjacent flat surfaces 52f as shown in FIG. 1 that may be particularly suitable for packaging systems that that can operate at reduced pressures suitable for low or medium temperature explosives emulsions. For additional details of this optional configuration, see, U.S. patent application Ser. No. 15/231,015, the contents of which are hereby incorporated by reference as if recited in full herein.

The encased elongated or tubular product can be an elongated food product, such as a meat product or other non-food product items. Exemplary meat products include, but are not limited to, strands of meat (that may comprise pepperoni, poultry, and/or beef or other desired meat), and processed meat products including whole or partial meat mixtures, including sausages, hotdogs, and the like. Other embodiments of the present invention may be directed to seal other types of food (such as cheese) or other product in casing materials. Examples of other products include powders such as granular materials including grain, and sugar, and or other flowable "pasty" or viscous materials such as, for example, explosives and the like or other flowable materials including wet pet food (similar to that held conventionally in cans) or other powder, granular, viscous, solid, semi-solid or gelatinous materials. The product may be a packaged product for any suitable industry including food, aquaculture, agriculture, environment, chemical, explosives, or other applications.

Figure 3:
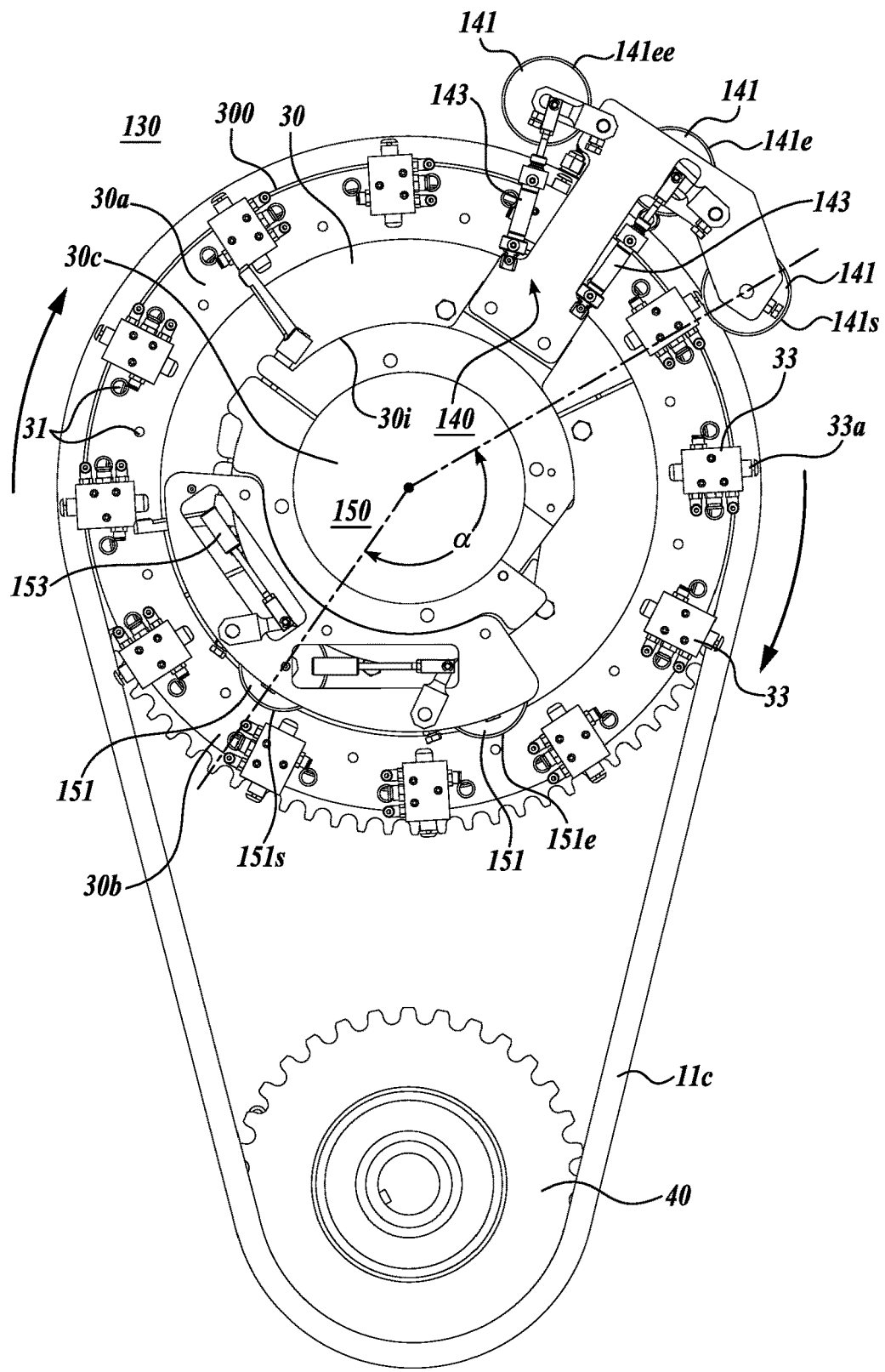
FIG. 3 is bottom view of a sprocket assembly according to embodiments of the present invention.
Figures 1, 4A:
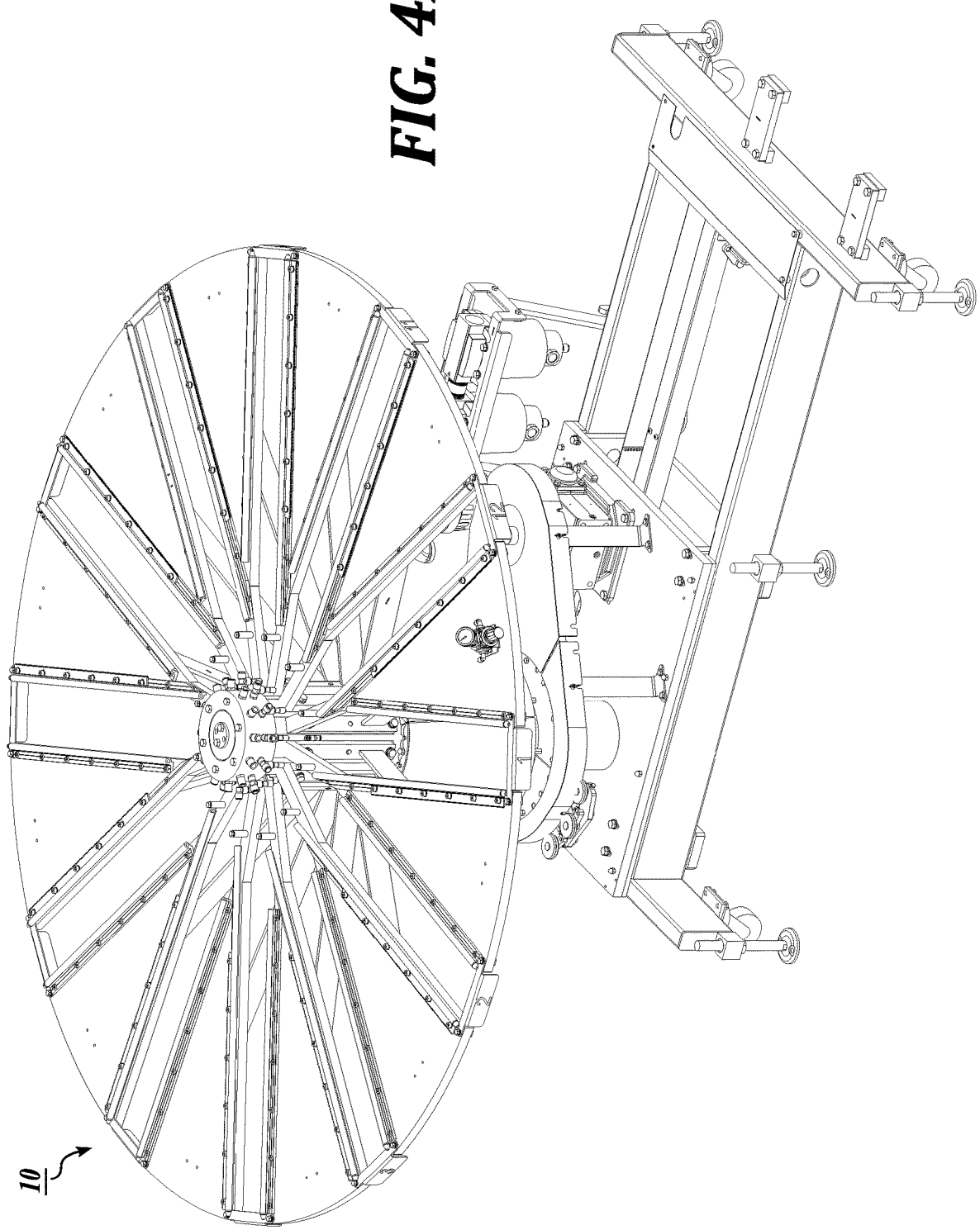
Figures 2, 4A:
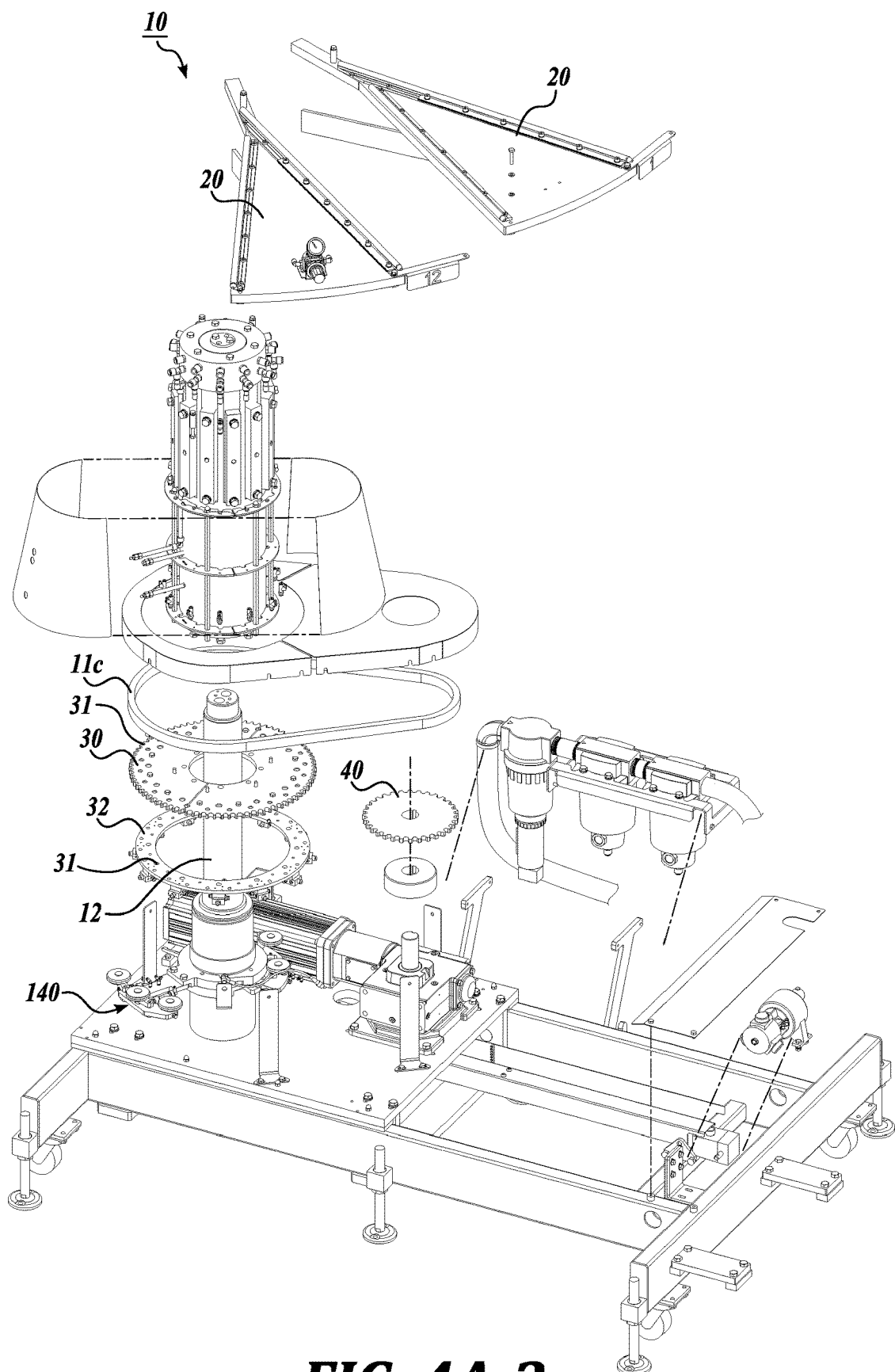
Figures 3, 4A:
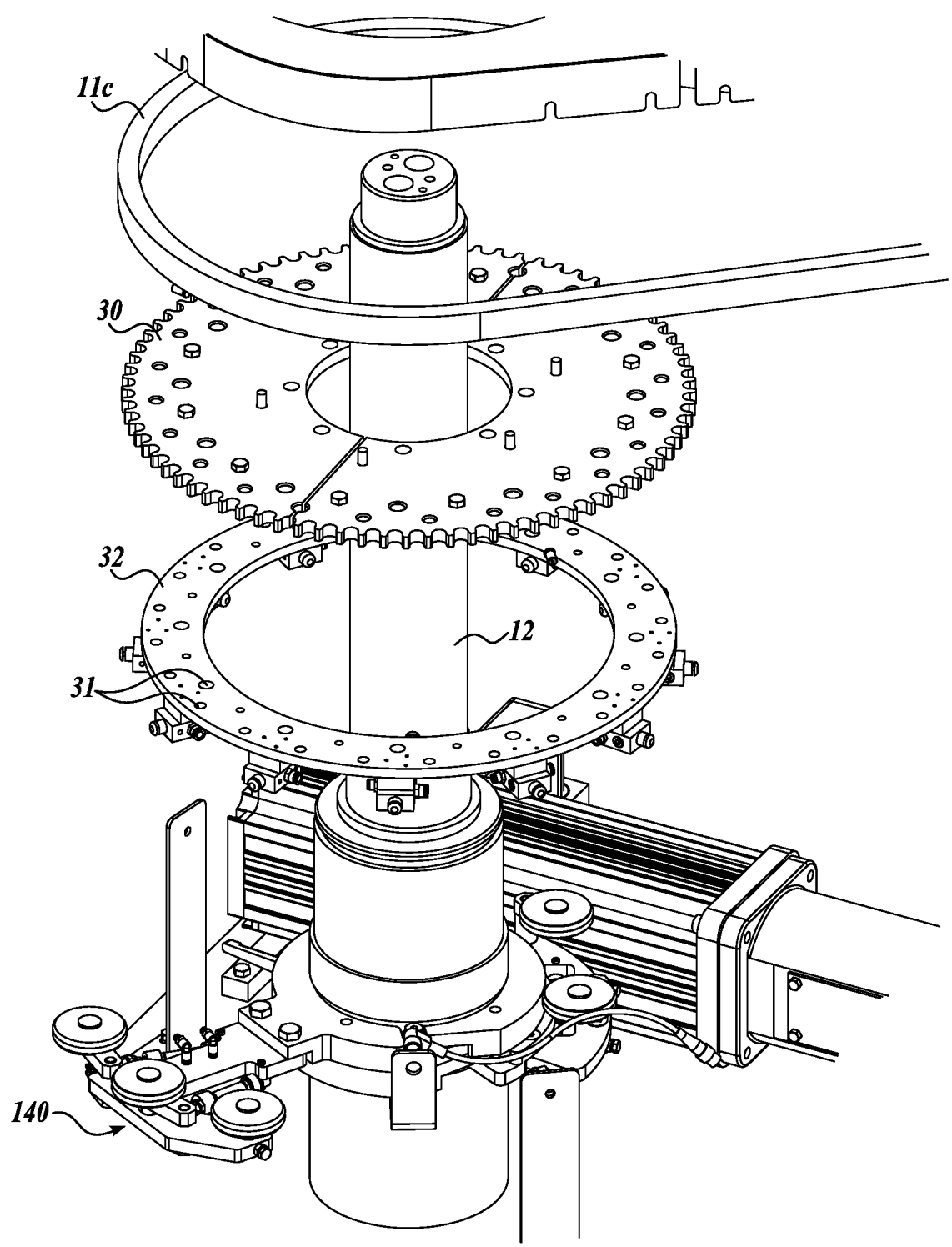

FIG. 3 illustrates a clipper gate control assembly 130. The assembly 130 includes a sprocket 30 and a plurality of circumferentially spaced apart pneumatic valves 33 held by the sprocket at an outer end portion thereof, a reset cam assembly 140 and a trigger cam assembly 150. The reset cam assembly 140 and the trigger cam assembly 150 can both comprise a plurality of spaced apart cams 141, 151. FIGS. 4A and 4B show the sprocket 30 relative to the column 12 and cam assemblies 140, 150. The sprocket 30 has an open circular center channel 30c that receives the column 12.

As shown in FIGS. 4A and 4B, in operative position, the cam actuated clipper (gate trigger and gate reset) valves 33 are under the sprocket 30. The valves 33 can be held on a support disk 32 that is attached to a bottom 30b of the sprocket 30. The support disk 32 can have a center with a larger diameter than that of the sprocket. The outer perimeter of the support disk 32 can align with an outer perimeter of the sprocket 30. Upwardly extending apertures 31 in the support disk 32 and the sprocket 30 can align to provide through channels for pressurized gas/air conduit or tubes, for example.

The valves 22v shown above the sprocket 30 in FIG. 2A are (typically manual) ball valves that are in-line with the clipper valves. They can be turned off to prevent a clipper 22 from cycling at all. The valves 22v can be used to run longer product by disabling some of the clippers 22 not needed, such as every other clipper to get a more than twice the normal length product, for example.

Referring to FIG. 3, the gate reset cam assembly 140 can be circumferentially spaced apart from the gate trigger cam assembly 150. The reset cam assembly 140 can comprise at least two reset cams 141, shown as three reset cams 141. The trigger cam assembly 150 can comprise at least two trigger cams 151. The reset cams 141 can be positioned so that at least a portion extend outside an outer perimeter 30o of the sprocket 30 while the trigger cams 151 can reside radially inward from the reset cams 141, between the inner and outer perimeters 30i, 30o of the sprocket 30. The cams 141 and/or 151 can have diameters that are the same or each may have a different diameter.

As shown in FIG. 3, centerlines of the standard cams 141s, 151s can be separated by an angle γ that is from 100-220 degrees, more typically from about 160 degrees to about 180 degrees.

The pneumatic valves 33 can have a box-like, rectangular body with a first primary surface held facing a planar primary surface of the sprocket 30. The pneumatic valves 33 can include inner and outer actuator contacting segments 33i, 33o. The segments 33i, 33o (i.e., button actuator components) on the ends of the valve 33 push an internal spool inside the valve 33 to shift the flow of air. One actuator contact segment communicates with the cams 141 of the reset cam assembly 140 and the other communicates with the cams 151 of the trigger cam assembly 150. As shown, the inner actuator segment 33i communicates with the trigger cams 151 and the outer actuator segment 33o communicate with the reset cams 141 but the reverse orientation may be used with a corresponding change in position of the trigger cams 151 of the trigger cam assembly 150 and the reset cams 141 of the reset cam assembly 140. The pneumatic valves 33 can be pneumatic directional push valves such as four-way two position trigger valves (mechanical air valve). An example valve is available as part number 41PP directional valve from Humphrey Products Corporation, Kalamazoo, Mich.

The reset cam assembly 140 can have one cam 141 as the "standard" or "default" cam 141s and at least one cam 141 can be a reset early cam 141e. The reset early cam 141e can be behind the reset standard cam 141s in a direction of rotation (shown as counterclockwise in the view of FIG. 3) of the column 12 and table 20. In the embodiment shown in FIG. 3, there are two reset early cams 141, one of which is a reset extra early cam 141ee which is behind the first early reset cam 141e in the direction of rotation shown.

The clippers 22 (typically between 10-14, and more typically up to 12) can be at least partially controlled by pneumatic valves 33 which are attached to the sprocket 30. The sprocket 30, valves 33, and clippers 22 are connected to a common column 12 so that they rotate together at operational speeds, typically between 10-50 rpm and more typically up to about 33⅓ rpm. The cam assemblies 140, 150 are static but the cams 141, 151 can be wheels or rollers that rotate relative to the mounting brackets 142, 152.

The mounting brackets 142, 152 can have cooperating arcuate members that attach together and define a center circular open longitudinally extending channel 142c, 152c.

Figure 5:
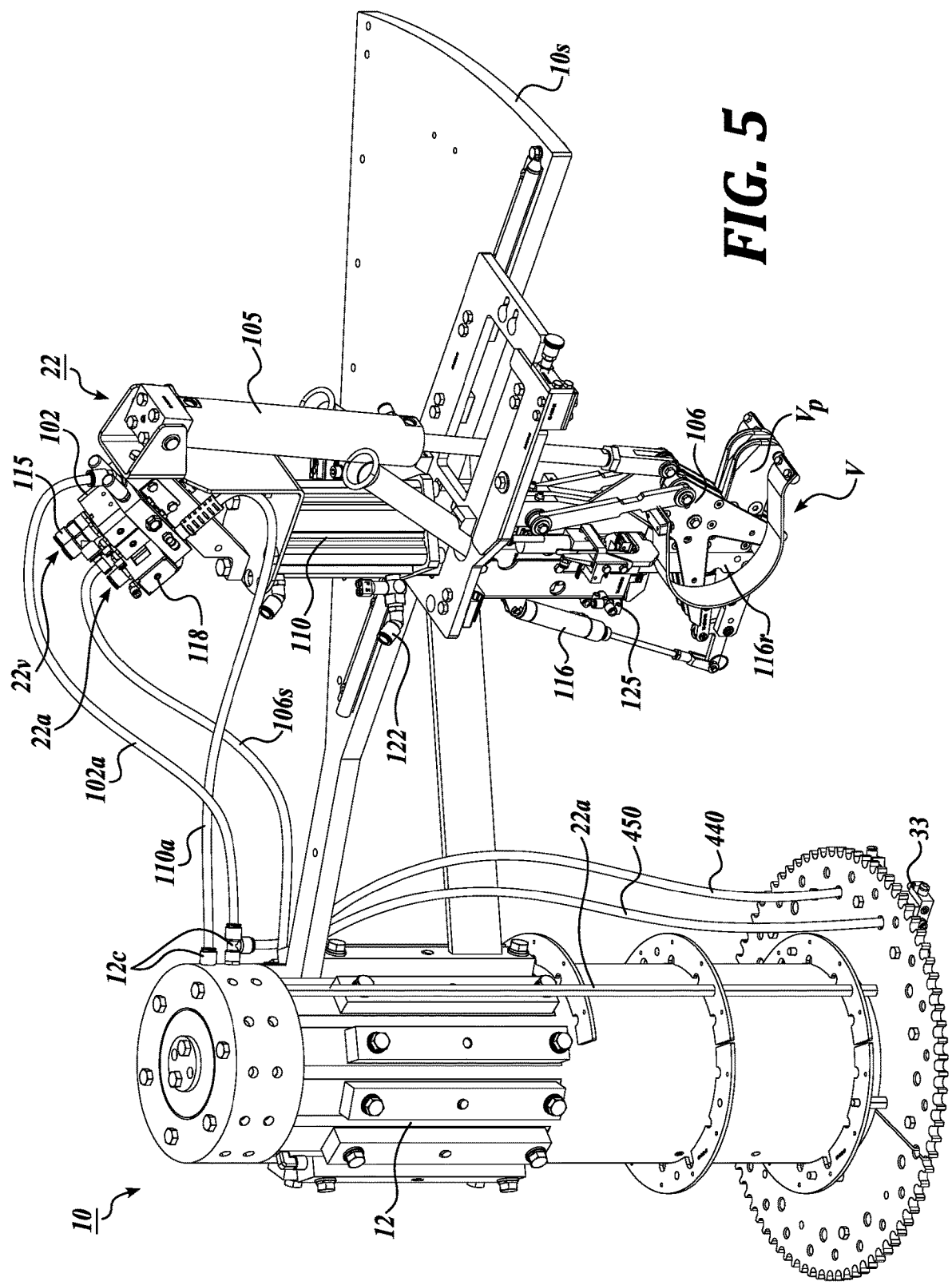
FIG. 5 is an enlarged partial assembly view of a rotatable column and a clipper assembly according to embodiments of the present invention.

One of the cams 151 of the trigger cam assembly 150 is used to trigger the valves 33. The trigger cam 151 actuates the respective valves 33 to close the corresponding clipper gate 106 (FIG. 5). This starts the clipping cycle. The reset cam 141 resets the respective valves 33 after the clipping cycle is complete. This opens the clipper gate 106 (FIG. 5) which causes the clipped product to be rapidly ejected.

As shown in FIGS. 3 and 7A-7C, the reset early cams 141e, 141ee can be actuated by a respective actuator 143, typically a pneumatic actuator. The reset standard cam 141s does not require an actuator in the embodiment shown as it is in an operative position unless one of the early reset cams is actuated to be on. However, the reset standard cam 141s may be actuated from home to operative position using an actuator or linkage, for example (not shown).

Figure 7A:
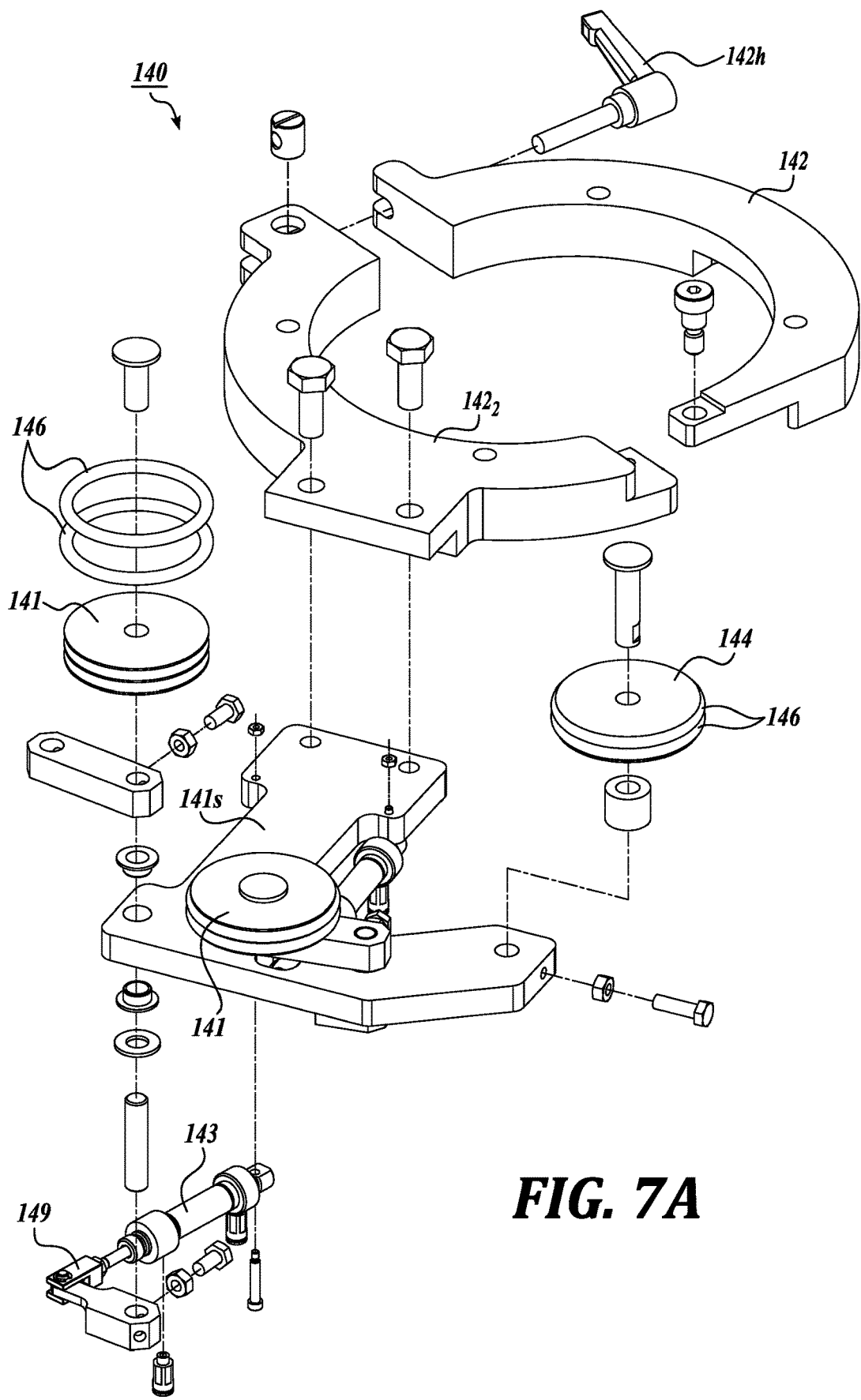
FIG. 7A is an exploded view of an exemplary clipper reset cam assembly according to embodiments of the present invention.
Figure 7C:
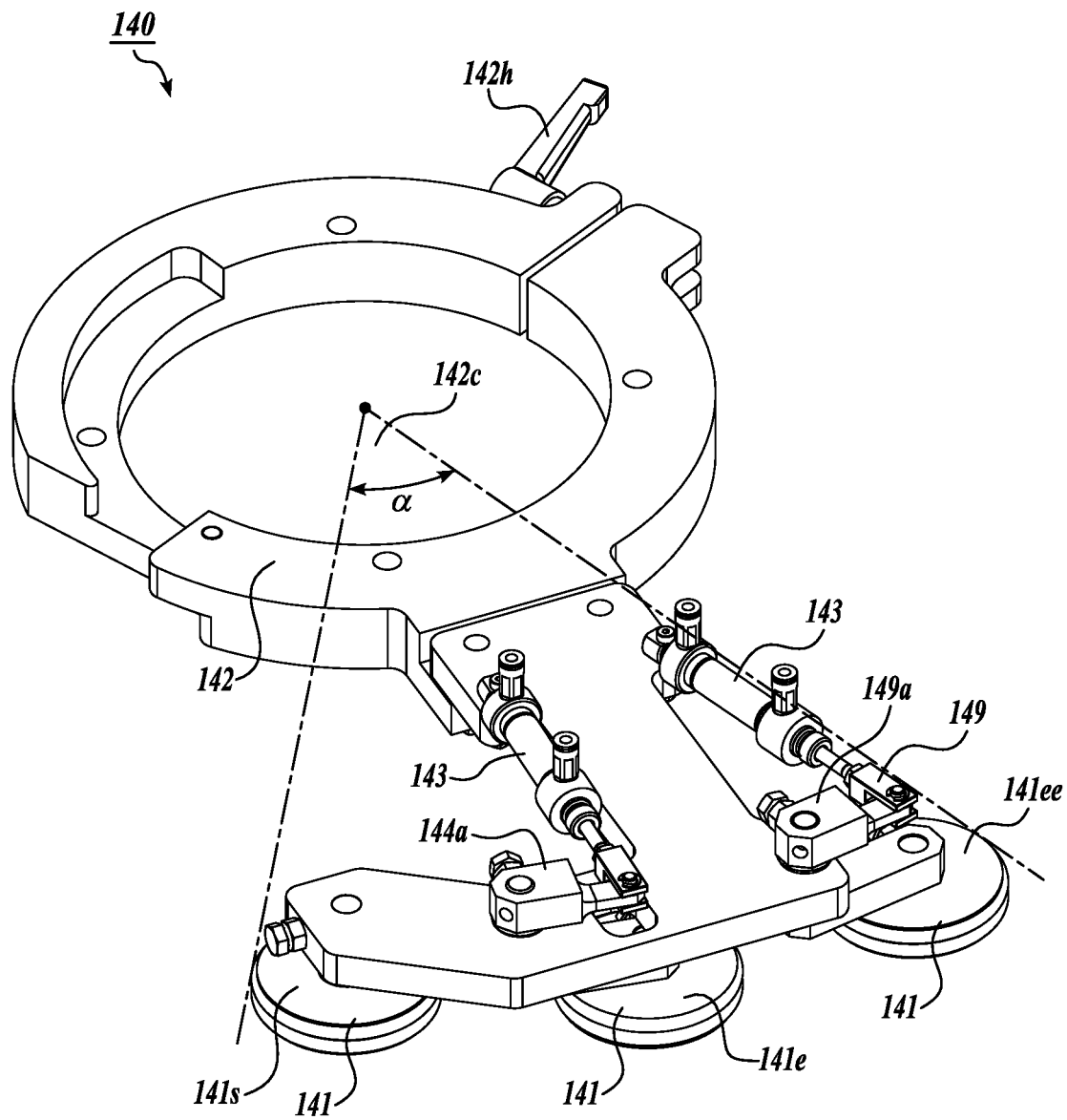
FIG. 7C is a top perspective assembled view (oriented to face away from the sprocket) of the reset cam assembly shown in FIG. 7A.

As shown in FIG. 7C, the cams 141 can reside within a perimeter that is less than 180 degrees of the channel 142c of the mounting bracket 142, typically residing in a space bounded by lines extending from the center of the channel 142c to an outer edge of the cams 141s, 141ee (hence center of the sprocket channel 30c) having an angular extent α of from 30-120 degrees.

Figure 2C:
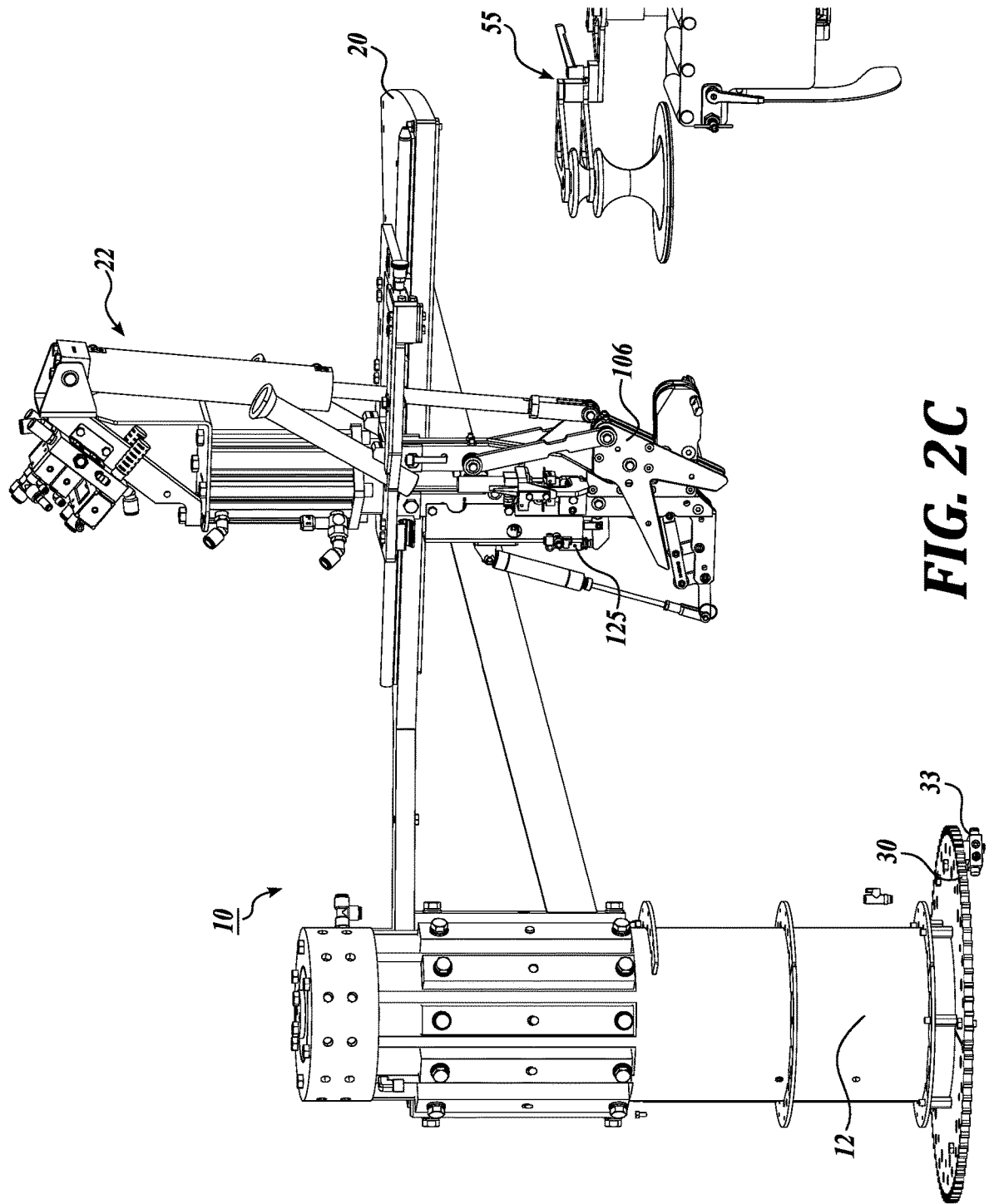
FIG. 2C is a side view of a portion of the packaging system shown in FIGS. 1 and 2B, according to embodiments of the present invention.

As shown in FIGS. 3 and 8A-8C, both trigger cams 151s, 151e can be controlled by a respective actuator 153, which can be a pneumatic actuator. If both trigger actuators 153 are off (deactivated or not actuated), the clippers 22 can rotate with the gates 106 open without cycling. This operational mode can be used during startup procedures. The standard trigger cam 151s can be used during slower speeds such as at speeds related to production of below 250 ppm. It is noted that the pieces per minute (ppm) parameter is related to the rotation per minute (rpm) of the column 12 and table 20 depending on the number of operational clippers (i.e., where there are 12 operational clippers, ppm=12*rpm). The trigger standard cam 151s position can be set so that if rotation stops at the trigger standard cam position, the gate closing does not hit the dancer 55 (FIGS. 2A, 2B, 2C).

Once the speed increases enough to miss the dancer 55 with the trigger early cam 151e, the trigger early cam 151e is activated. Since the gate 106 takes some small amount of time to move once activated, the "trigger early" cam 151e can be activated before the clipper gate 106 is activated by the dancer 55. This gives the clipper 22 more time to complete the clipping cycle.

The reset cam assembly 140 works similarly. The reset standard cam 141s can be fixed in position. It ensures that the clipper 22 is always being reset at the end. As the speed of rotation of the table 20 increases, the reset early cam 141e can be automatically activated to start the gate 106 opening reset earlier than with the standard reset cam 141s. This helps keep the product ejection closer to the same position at different speeds. There can also be a reset extra early cam 141ee that can be automatically activated above a greater speed threshold than the first early cam 141e.

Figure 6:
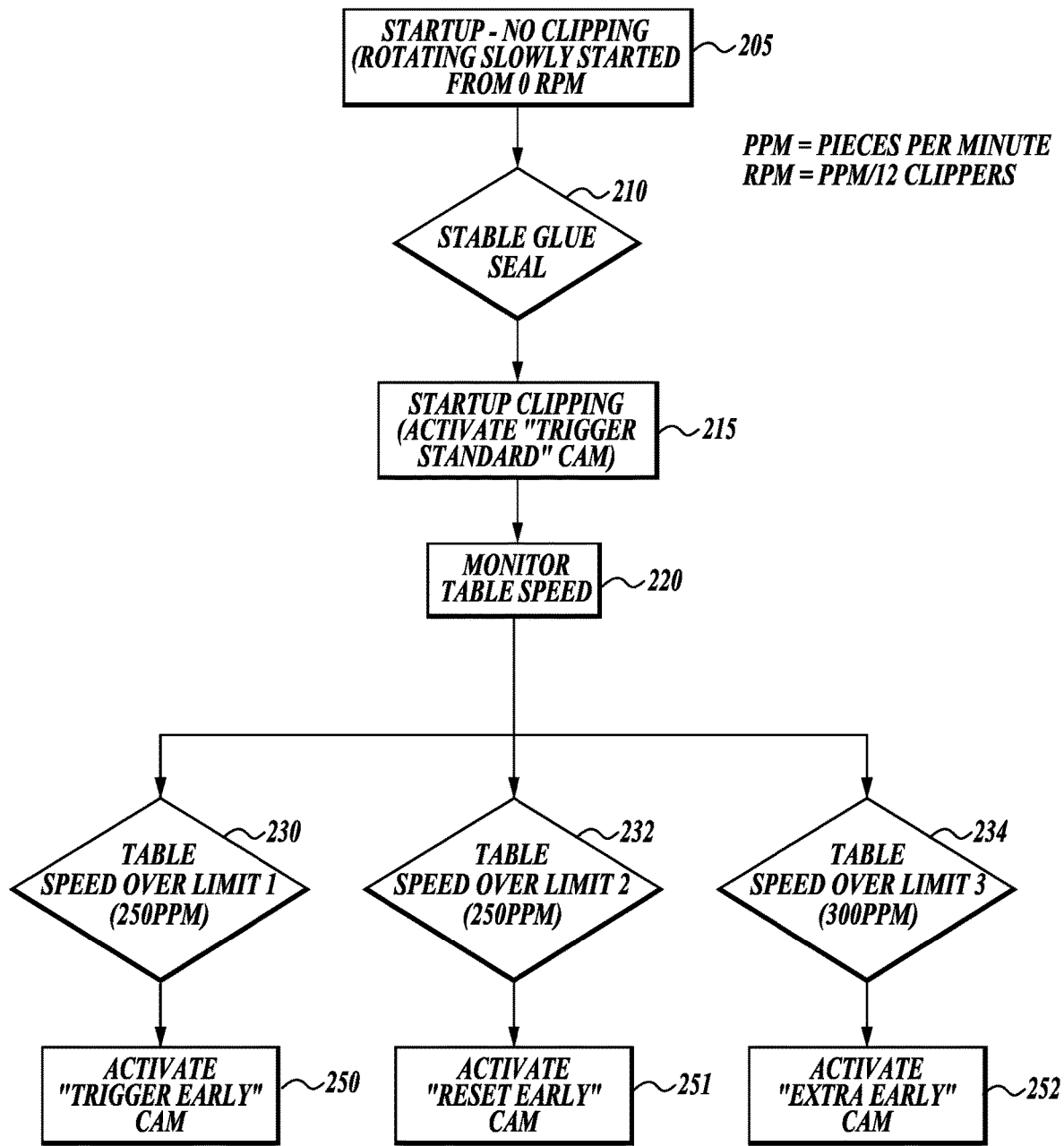
FIG. 6 is a flow chart of exemplary actions that can be used to carry out embodiments of the present invention.

FIG. 6 illustrates an exemplary flow chart of automatic clipper operations that can be carried out according to embodiments of the present application. At start-up, the packaging machine ramps up from shut down (0 rpm) to a rotating speed (block 215). Activating an adhesive (hot melt glue) supply to be operational (at temperature and delivering adhesive from a supply discharge port upstream of the packaging table 20) (block 215). Monitoring table speed (block 220). Determining when table speed is over a first threshold limit (limit 1) (block 230), a second threshold limit (limit 2) (block 232) and a third threshold limit (limit 3) (block 234), typically associated and/or defined for a respective ppm output. The three speed thresholds/limits can be independent of each other but limit 3 is greater than limit 2. If the table speed is over limit 1, the trigger early cam is activated (block 250). If the table speed is over limit 2, the reset early cam is activated (block 251), if the table speed is over limit 3, the reset extra early cam is activated (block 252). The method can also work in the reverse where the "early" cams are turned off when the speed is reduced to be below limit 1. For example, the trigger early cam is deactivated and/or the reset early cam is deactivated when the table speed is below limit 1. Alternatively, for speeds below limit 3, the reset extra early cam is deactivated.

The table speed first threshold limit (limit 1) can be a limit that is less than an expected maximum production limit by between 50-75%, and/or a limit based on a production of over 250 ppm when a max capacity production is about 400 ppm. The table speed second threshold limit (limit 2) can be within +/−10% of limit 1, and/or based on a production of over 250 ppm. The table speed third threshold limit (limit 3) can be greater than limit 1 and limit 2, and/or be associated with a greater piece per minute production, i. e., 300 ppm. The table speed threshold limit for limit 3 can be 40-100 ppm greater than limit 1 and/or limit 2, typically at a rate for producing about 50-100 ppm more than the speed at limit 1 and/or 2.

FIGS. 7A-7C illustrate an exemplary embodiment of the reset cam assembly 140. The assembly 140 can include a mounting bracket 142 with an open, typically circular, center 142c that extends about the rotatable center column 12 of the packaging machine (FIGS. 1, 2A, 2B, 2C, 4A). In some embodiments, the mounting bracket 142 has two semi-circular mounting members $142_1$, $142_2$ that can pivot open and closed via pivot joint 142*j*. A handle 142*h* can be used to secure the two members 142₁, 142₂ together.

The assembly 140 can include at least one actuator 143 that actuates the at least one reset early cam 141*e*. As shown, there are two actuators 143 and two early reset cams 141*e*, 141*ee*. The at least one actuator 143 can extend radially straight outward from the center 142*c* of the mounting bracket 142. The mounting bracket 142 can include at least one (shown as a single) side extension 142*s* that holds all the reset cams 141. The actuators 143 can include an end portion with a clevis 149 attached to a clevis arm 149*a*. The clevis arm 149*a* is attached to the bracket 142 and allows the attached cam 141 to pivot into position and relative to the mounting bracket 142. The cams 141 can be held on a respective arm 148 that is attached to the mounting bracket 142.

Figure 8A:
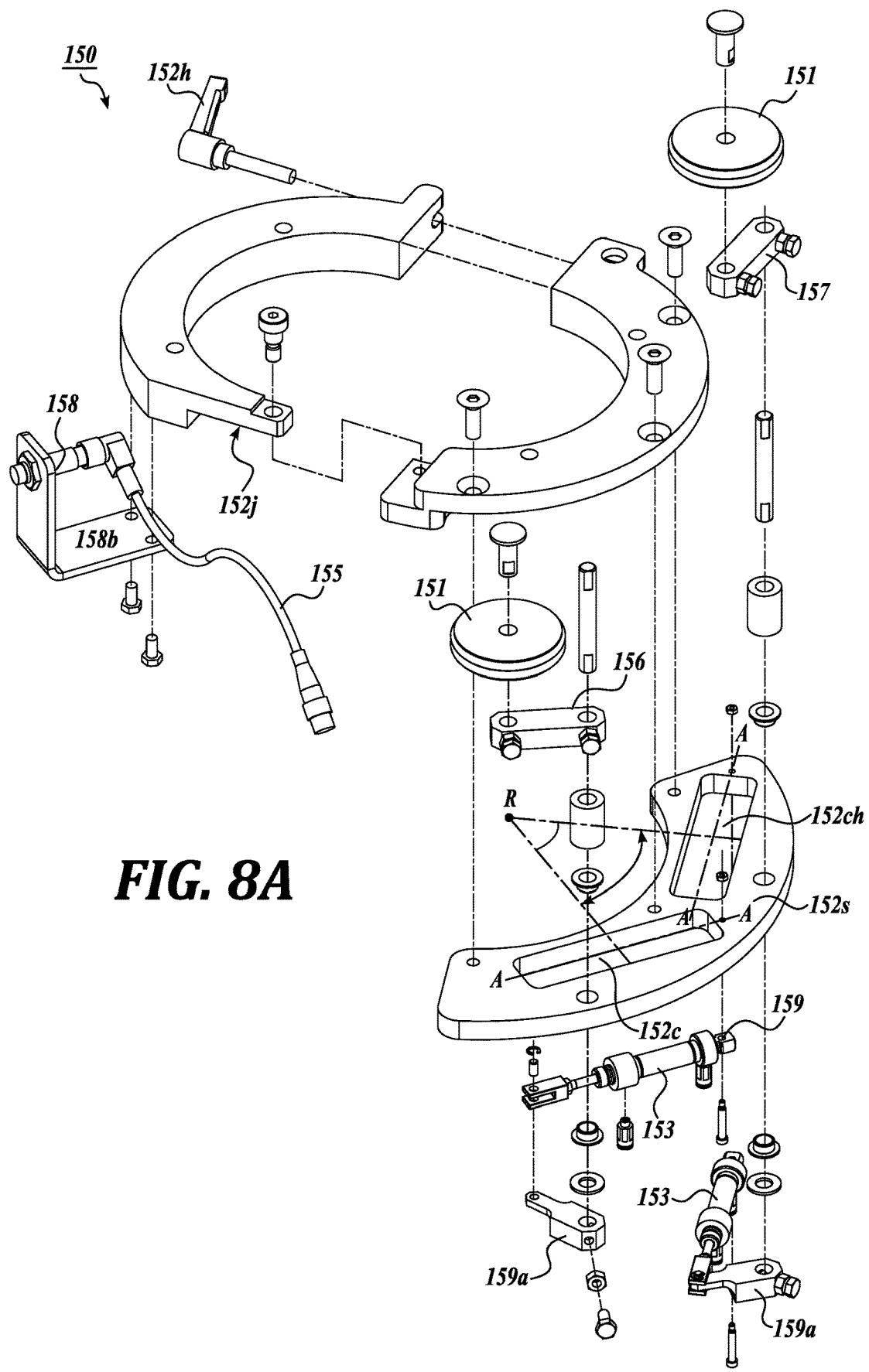
FIG. 8A is an exploded view of an exemplary clipper trigger cam assembly according to embodiments of the present invention.
Figure 8B:
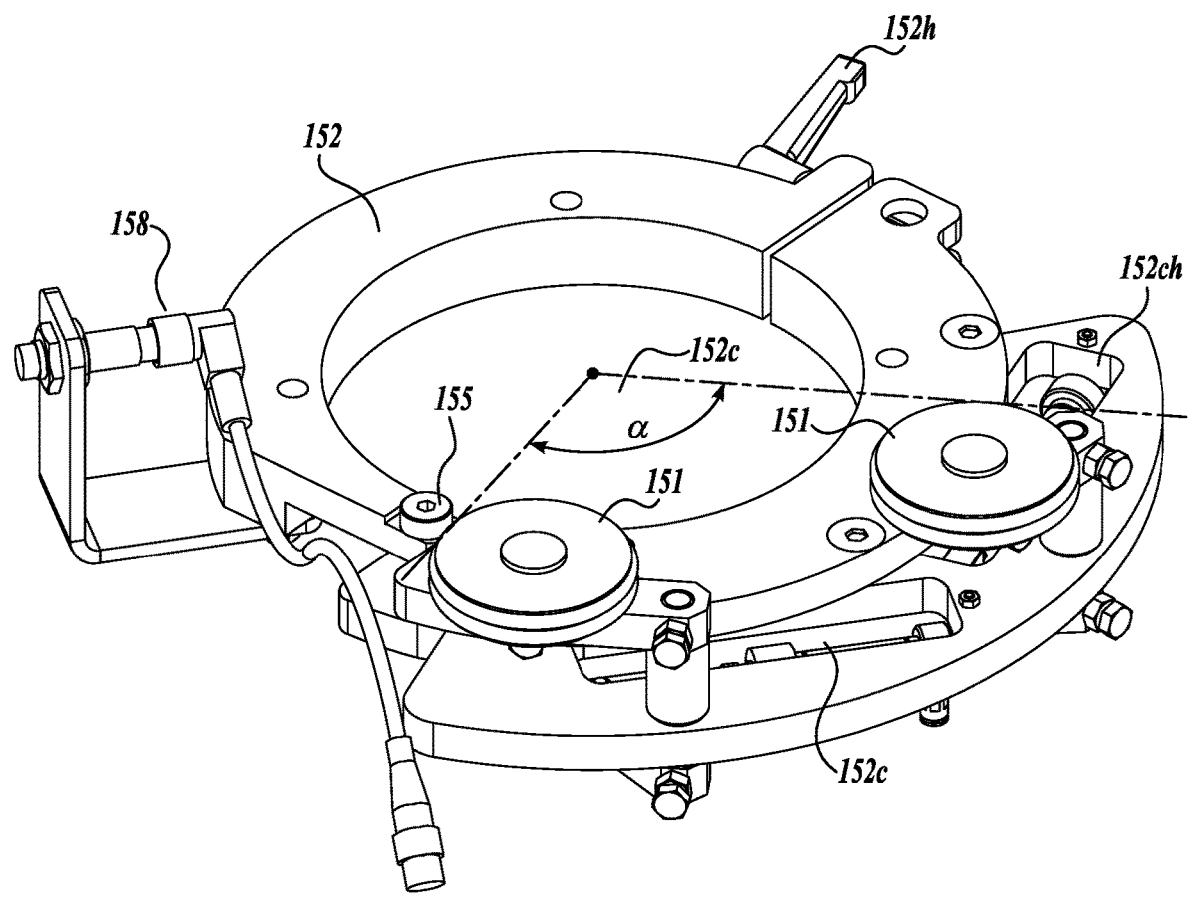
FIG. 8B is a side perspective assembled view of the trigger cam assembly shown in FIG. 8A.

FIGS. 8A-8C illustrate an exemplary embodiment of the trigger cam assembly 150. The assembly 150 can include a mounting bracket 152 with an open, typically circular, center 152*c* that extends about the rotatable center column 12 of the packaging machine (FIGS. 1, 2A, 2B, 2C, 4A). In some embodiments, the mounting bracket 152 has two semi-circular mounting members 152₁, 152₂ that can pivot open and closed via pivot joint 152*j*. A handle 152*h* can be used to secure the two members 152₁, 152₂ together.

The assembly 150 can include at least one actuator 153 that actuates the standard cam 151*s* and the at least one trigger early cam 151*e*. As shown, there are two actuators 153 and two reset cams 151. The actuators 153 can extend in open channels 152*ch* in a side mounting bracket 152*s* that is attached to the primary mounting bracket 152. The actuators 153 can include an end portion with a clevis 159 attached to a clevis arm 159*a*. The clevis arm 159*a* is attached to the side bracket 152*s* and allows the attached cam 151 to pivot into position and relative to the mounting bracket 152.

The actuators 153 can have a longitudinal axis A-A that intersects a line extending from the radius line R (FIG. 8A) drawn from a center of the bracket 152, typically at an angle β that is between 60 and 120 degrees.

The cams 151 can be held on respective arms 157 that are attached to the side bracket 152*s*. The side bracket 152*s* may be arcuate as shown and can have an inner perimeter that resides inside an outer perimeter of the first side member 152₂ of the primary mounting bracket 152.

The cams 151 can reside within a perimeter that is less than 180 degrees of the channel 152*c* of the mounting bracket 152, typically residing in a space bounded by a lines extending from the center of the channel (hence center of the sprocket channel 30*c*) to outer edges of the cams 151 at an angular extent α that is from 20-90 degrees (see FIG. 8B).

The cams 141, 151 can be cam rollers and can have outer diameters of between 1-3 inches, more typically between 2-2.5 inches. The cams 141, 151 can comprise an outer surface with circumferentially extending grooves 141*g*, 151*g* that receive respective O-rings 146, 156. The O-rings 146, 156 can have an outer diameter from 1-3 inches, more typically about 2.520 inches, in some embodiments.

FIGS. 8A-8C show that the trigger cam assembly 150 can include a position sensor 158 held by a bracket 158*b* attached to the mounting member 152 to face the open center 152*c*. The sensor 158 can have an electrical line 155 that is attached to the controller 10*c* (directly or indirectly, wired or wireless). The sensor 158 can be a proximity switch with a range from 7-12 mm but other ranges and switches/sensors may be used including, without limitation, optical sensors, infrared sensors and the like.

As shown in FIG. 5, the clipper assembly 22 can include a valve assembly 22*a* comprising plurality of valves 22*v* at a common location on a top portion of the clipper assembly 22. The valves 22*v* are configured to provide pressurized gas, typically air, to defined components such as actuation cylinders or other components. However, the valves 22*v* can be distributed or held separately or in different sub-combinations as subassemblies and/or positioned at other locations on the clipper assembly 22.

FIG. 5 illustrates that each clipper assembly 22 can include a gate cylinder 105 in communication with a gate valve 102 and a gate rod 106*r* attached to the gate 106, a punch cylinder 110 in communication with a punch valve 118 and trigger valve 33, a knife cylinder 116 in communication with a knife or cutting blade 116*k* and a punch trigger valve 125. The punch valve 118 provides pressurized air to a punch cylinder 110 that drives at least one punch 110*p* to drive clips down to a clip die to force a respective clip to close about a target (gathered) end portion of a product in a casing as is well known to those of skill in the art. If there is nothing in the clipper 22 when the gate 106 closes, then the punch trigger valve 125 does not activate which keeps clips from being formed in the clipper dies with no product to carry them away.

Figure 12:
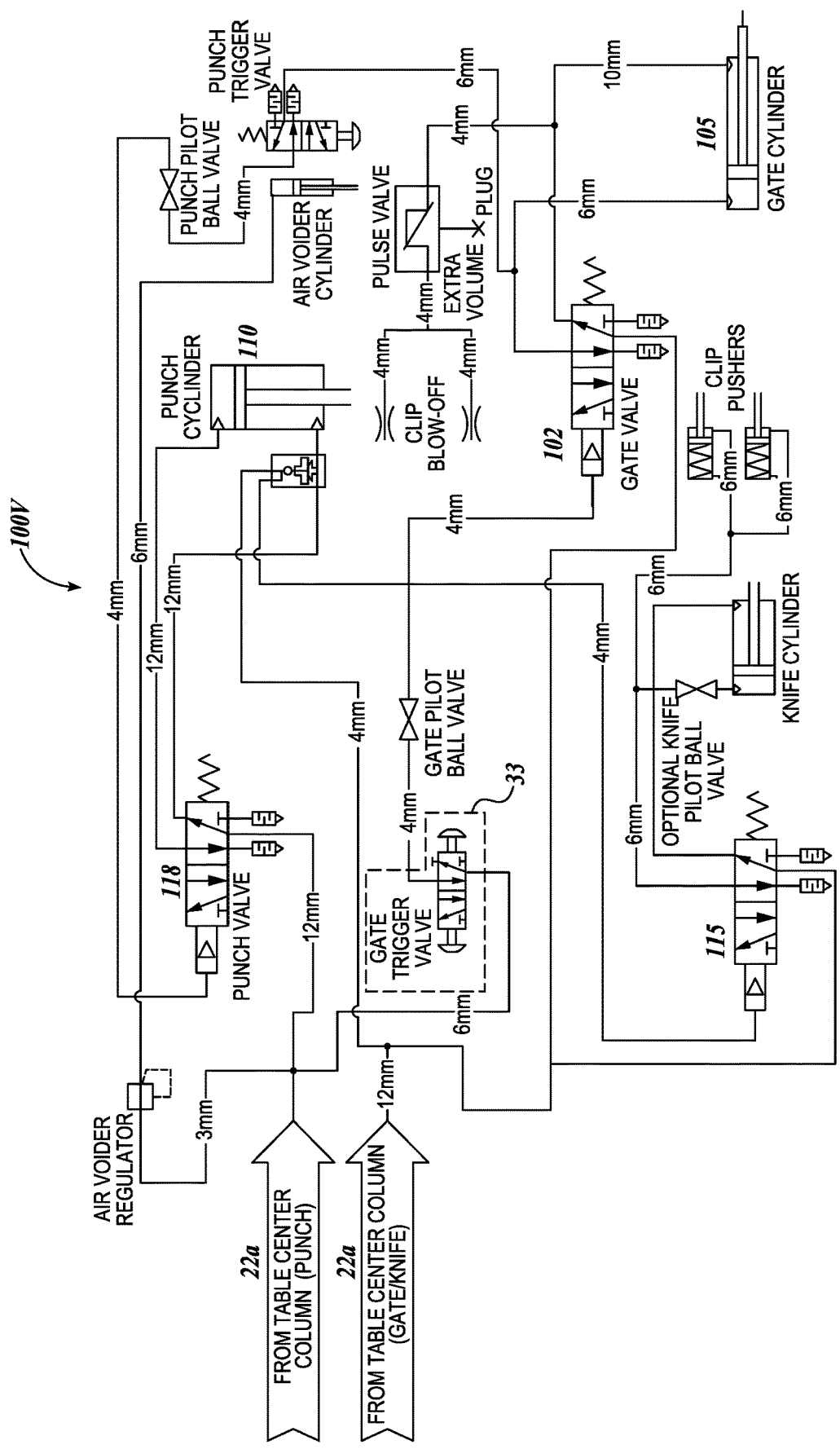
FIG. 12 is a schematic of pressurized air connections and pneumatic valves held by the sprocket and the clippers according to embodiments of the present invention.

FIG. 5 also illustrates air supply lines 440, 450 in fluid communication with the gate trigger valve 33 that extend up the column 12 to connectors 12*c*. The supply conduit or tube 440 provides a pressurized gas (i.e., air) supply to the valve 33 under the sprocket 30. The supply conduit or tube 450 provides an air supply to the connector(s) 12*c*. A signal line 106*s* provides a gate close signal to the clipper 22. The gate air supply 102*a* supplies all air for operation of the clipper 22 except for the punch which as a dedicated punch air supply 110*a*. For ease of discussion, there are numerous pneumatic lines on the clipper that aren't shown in this figure. FIG. 12 provides an example valve circuit 100*v* schematic according to particular embodiments of the present invention.

The knife valve 115 supplies pressurized gas, typically air, to a knife cylinder 116 that can extend and retract a knife to sever clipped end portions of the casing as is well known to those of skill in the art. A mechanically driven knife may alternatively be used. The knife can be a sharp cutting implement or may comprise a laser, heater or other cutting configuration.

The gate valve 102 supplies pressurized gas, typically air, to a gate cylinder 105. The gate cylinder 105 moves the gate 106 (FIG. 5) in and out of operative position as is well known to those of skill in the art. The clipper assembly 22 can also include at least one voider plate V. When in a defined position, the voider plate Vp can cause the trigger valve 33 to send a signal to the punch valve 118 to initiate a clip cycle where the punch operates to punch down to apply a clip.

As shown in FIG. 2A, there can be two air lines 22*a* that run down the center column 12 for each clipper station 10*s*. One line is the main air line for the trigger valve 33 underneath the sprocket 30 (FIG. 3). The second air line allows the clipper gate 106 of the respective clipper 22 to close. The second air line can have an inline shut off valve 22*v* installed in the tubing. A user can select the number of clippers to be operated for production using the system (HMI/PLC) controller 10*c*. The controller 10*c* and/or control circuit 100 (FIG. 11) can calculate length and ppm values based on this and select speed threshold limits for the standard and early cams of the respective cam assemblies 140, 150. As with conventional rotating platform clippers, in operation, the sealed filled tubular covering is clipped and clipped product is cut apart under the platform table surface.

As discussed above, if the inline shut off valves 22v are used, each shuts off the air to a respective gate cylinder 105 (FIG. 5) on that individual clipper 22. If the gate 106 does not close, the clipper 22 will not "fire" (send down the punch or fire the knife). The reason behind turning off a clipper 22 is to run a longer product than the normal length of product (e.g., chub) each clipper can handle. For example, if clipper #1 is on, clipper #2 is off, and clipper #3 is on, the product length becomes the distance from the #1 clipper to the #3 clipper.

This activation/deactivation status can be based on the "recipe" selected by a user during set-up. The term "recipe" means that the system 10 can be preloaded, programmed and/or configured with a plurality of different operating conditions and/or configurations based on the desired output. The system 10 can accept user input to select the desired product and the system can automatically electronically implement different parameters such as different drive speeds, table position, extruder speed, desired clipper activation pattern such as, for example, clipper nos. 1, 3, 5 . . . 11, clipper nos. 2, 4, 6, 8, 10, 12, clipper nos. 1, 2, 4, 5, 7, 8, 10, 11, or clipper nos. 1-12, and the like, used based on a pre-defined "recipe" that can generate the desired output.

The user input can be a list or blocks on a display with visual indicia of product types, names and/or desired product length. The system can define the related operational parameters to achieve this output based on the recipe. The recipe may be size- and/or product-specific. Thus, for example, the recipe can be programmed and configured to include an electronic library and/or look-up table of clipper position (e.g., which pin aperture number to use on the clip mounting slide bar and clip guides), which can be visually displayed for an operator and can also automatically activate the desired clippers 22 and select the platform 20 rotation speed, the covering draw speed (e.g., film or casing), and the adhesive extruder speed.

In some embodiments, the table 20 can accept different sized clippers 22, such as a "100" series clipper available from Tipper Tie, Inc., Apex, N.C. and a "200" series clipper available from Tipper Tie, Inc., Apex, N.C. The 100 series can have a 100T clip size and the 200 series clipper can operate with a Z200 clip size. The 100 series clip sizes (smaller clipper) is normally used for products having about a 0.75 inch diameter to about a 1½ inch diameter. The 200 series (larger clipper) is normally used for product sizes up to about 3½ inch in diameter.

As discussed above, the rotating platform 20 has a vertical support column 12 which is in communication with the main drive system 20d that rotates the platform and clippers 22 at the desired speed (and can automatically vary the speed depending on production requirements/inputs). The air supply lines that connect to the various clippers 22 can travel down the column 12 to an air supply. The system 10 can include a single common main air supply that can be diverted to feed all of the clippers 22. Alternatively, each or groups of the clippers 22 may have a dedicated discrete air supply. Each clipper 22 can include on-board air supply conduits/lines with valves that releasably connect to the air supply lines on the column 12. The large clippers 22 may have larger valves relative to the smaller clippers 22 but can mount to the platform 20 using the same mounting hardware and/or mounting configuration as the smaller clippers, including allowing for the same fine and gross position adjustment as will be discussed further below. The air supply can be provided at any desired operating pressure sufficient to run the clippers at a desired speed, typically at a pressure between about 80-125 psi. The large and small clippers 22 can interchangeably attach to the air supply lines at each clipper station 10s on the platform 20 and the clip air supply lines on the platform can have standardized fittings that interconnect to each type of clipper 22.

FIG. 3 shows that the sprocket 30 can be a split sprocket. The split sprocket 30 is typically in two equal pieces 30a, 30b, but may be in more than two pieces and may not be symmetrically split. The sprocket 30 can also include spaced apart holes or apertures 31 that direct/route the airlines 22a from each clip station 22 beneath the sprocket 30. As shown in FIGS. 2A, 2B, the table (vertical) support column 12 rotates in response to a drive system 10d such that rotation of the sprocket 30, can be driven by the chain or belt drive 11c and motor 11. A suitable split sprocket is available from Martin Sprocket and Gears, Inc., located in Mansfield, Tex.

Dual clipper configurations employ two punches, typically operated using a single pneumatic cylinder 110. See, U.S. Pat. No. 5,495,701, which describes a mechanism that has two punches, one of which is driven directly by a pneumatic cylinder and the other of which is connected to the first punch using a pin and key assembly. The pin and key assembly allows the punches to be coupled or decoupled to the pneumatic cylinder drive to apply one single clip or two clips simultaneously. See also, U.S. Pat. Nos. 6,920,738 and 5,586,424 for discussion of clippers and movement of U-shaped clips along a rail, as well as a clip feed for advancing clips on a guide rail and an arm that is reciprocally driven by a piston and cylinder arrangement. The contents of each of these patents are hereby incorporated by reference as if recited in full herein.

The clipper (or clipper assembly) 22 can have a defined clipping cycle to successively and rapidly clip lengths of filled casing. The clipping cycle includes a reset period during which the cylinders 105, 110, 116 (FIG. 5, 12) can reset to a retracted or home position/configuration substantially simultaneously. Within the clipping cycle, about half of the time is for clipping and resetting. In some embodiments, the packaging machines 10 can also direct the clippers 22 to generate a clip blow off pulse after reset during an idle period associated with the other half of the clipping cycle. The clip blow off pulses can be generated at between about 5-30 per minute, associated with an idle portion of each respective clipping cycle. See, U.S. Ser. No. 14/508,142 (US 2015/0128524) for additional discussion of an exemplary clip blow off system, the contents of which are hereby incorporated by reference as if recited in full herein.

Figure 9:
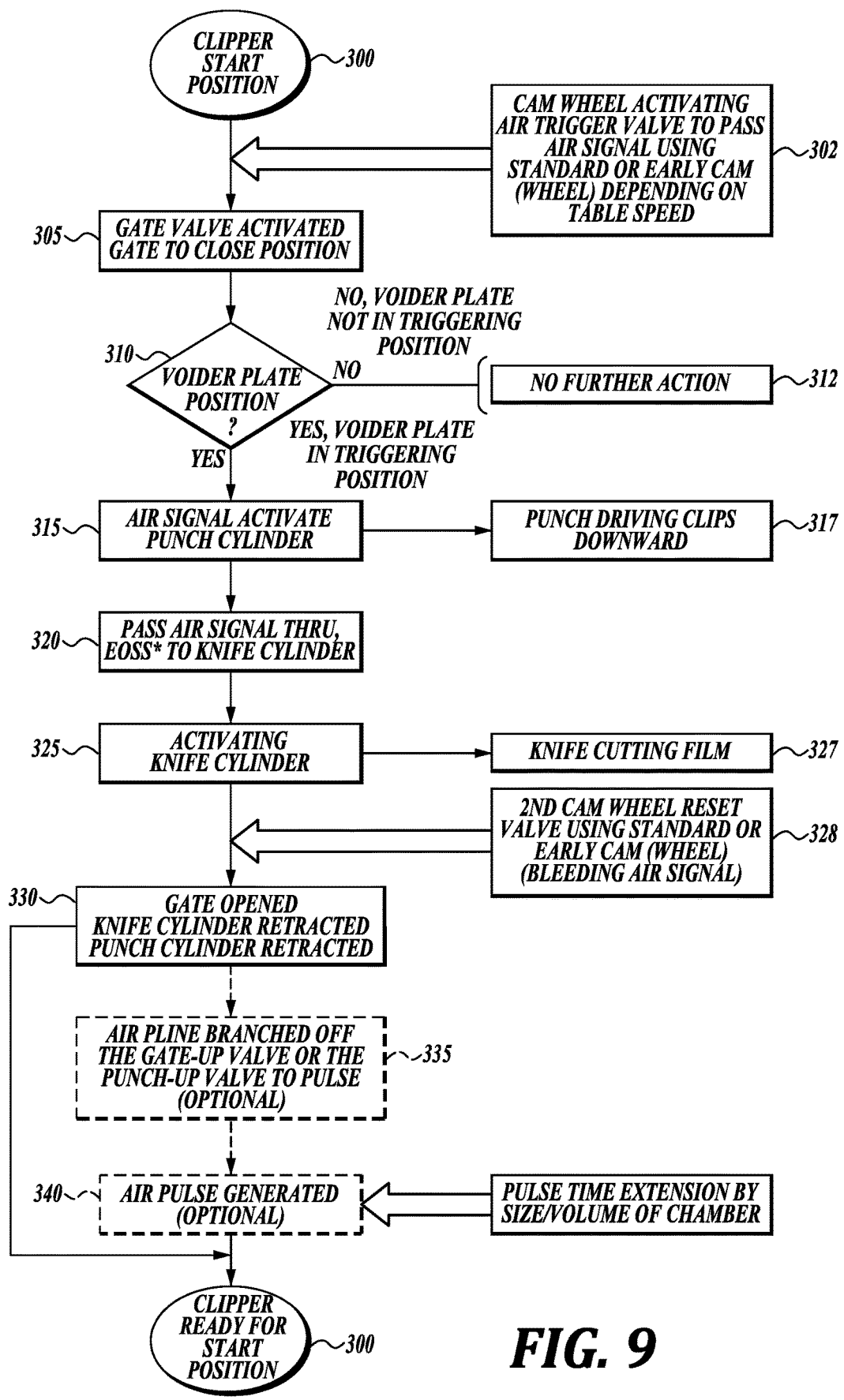
FIG. 9 is a flow chart of exemplary actions that can be used to carry out embodiments of the present invention.

FIG. 9 illustrates an exemplary (successively repeatable) clipping cycle having a clip blow off operation according to some embodiments of the present invention. As shown, the clipper assembly has a start position (block 300). A cam (wheel) is activated to activate the trigger valve to pass an air signal using a standard or early trigger cam depending on table speed (block 302). The gate valve is activated to move the gate to a closed position (block 305). A sensor can detect whether a voider plate is in position (block 310). For safety, further action can be prevented if the voider plate is not in its operative position (block 312). If yes, an air signal can activate the punch cylinder (block 315). This drives the clips downward over and into the clip die (block 317). The air signal is passed through the EOSS to the knife cylinder (block 320). The knife cylinder is activated (bock 325). The knife then cuts the casing (block 327).

The early or standard cam selectively can reset the trigger valve (bleeding air signal) depending on table speed (block 328). The gate can be opened, the knife cylinder retracted and the punch cylinder retracted (block 330).

Optionally, air can be branched off from the punch valve or gate valve to a pulse valve to generate a clip blow-off air pulse (block 335). The clipper is ready for a subsequent cycle in the start position (block 300) to repeat the cycle.

Figure 10:
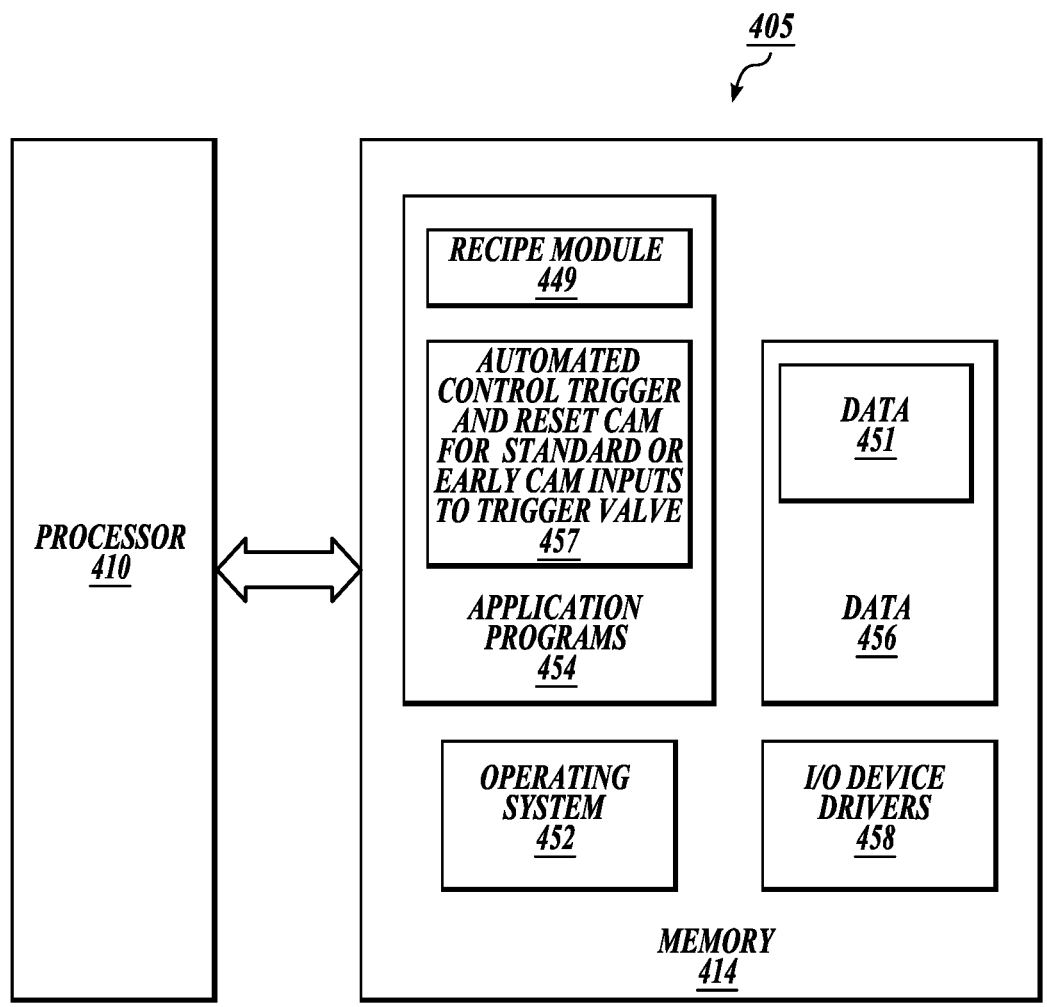
FIG. 10 is a block diagram of a data processing system for a rotating table multi-clipper packaging system according to embodiments of the present invention.

The operation and sequence of actions and/or events and can be controlled by at least one programmable logic controller (PLC). The operational mode and certain input parameters or machine controls can be selected or controlled by an operator input using a Human Machine Interface (HMI) to communicate with the controller as is well known to those of skill in the art. FIG. 10 is a block diagram of exemplary embodiments of data processing systems that illustrates systems, methods, and computer program products in accordance with embodiments of the present invention. The processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

The processor 410 may include one or more data processing circuits, such as a general purpose and/or special purpose processor (e.g., microprocessor and/or digital signal processor) that may be collocated or distributed across one or more networks. The processor 410 can be configured to execute computer program code in the memory, which is as a non-transitory computer readable medium, to perform at least some of the operations described herein.

As shown in FIG. 10, the memory 414 may include several categories of software and data used in the data processing system 405: the operating system 452; the application programs 454; the input/output (I/O) device drivers 458; the Automated Trigger and Reset Cam Control Module for Standard or Early Cam Inputs to the Trigger Valve and Drive Module 457 and/or Recipe Module 449; and the data 451 and/or 456.

The data 456 may include a look-up chart of different "recipes" as well as the associated drive speeds, clipper and table position set-up information, and the like, corresponding to particular or target products for one or more producers. The data 451 can comprise trigger and/or reset early threshold speed limits for actuating the trigger early and/or reset early cams 151e, 141e. The data 456 may be in or comprise a synchronized drive module for synchronizing the drive speeds of the different cooperating systems, e.g., film drive system, the table rotation drive system, the extruding speed of the extruder for the adhesive delivery/output, pump speed, and the like. The speed of the film/covering system 65 or rotation speed of the table 20 and the like can be adjusted based on real-time feedback of the operative status of the machine such as from the tension/force feedback from the dancer arm discussed above with respect to FIG. 2A, 2B, 2C. Selection of all, groups and/or individual clippers 22 can be automated based on the "recipe" to activate or deactivate certain clippers at different (typically alternating) clipper stations, e.g., stations 1-12.

As will be appreciated by those of skill in the art, the operating system 452 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 458 typically include software routines accessed through the operating system 452 by the application programs 454 to communicate with devices such as I/O data port(s), data storage 456 and certain memory 414 components and/or the dispensing system 420. The application programs 454 are illustrative of the programs that implement the various features of the data processing system 405 and preferably include at least one application which supports operations according to embodiments of the present invention. Finally, the data 456 represents the static and dynamic data used by the application programs 454, the operating system 452, the I/O device drivers 458, and other software programs that may reside in the memory 414.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the HMI computer (or at least one processor thereof), partly on the HMI computer, as a stand-alone software package, partly on the HMI computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

While the present invention is illustrated, for example, with reference to the Modules 449, 450 being an application program in FIG. 10, as will be appreciated by those of skill in the art, other configurations may also be utilized while still benefiting from the teachings of the present invention. For example, the Modules 449, 450 may also be incorporated into the operating system 452, the I/O device drivers 458 or other such logical division of the data processing system 405. Thus, the present invention should not be construed as limited to the configuration of FIG. 10, which is intended to encompass any configuration capable of carrying out the operations described herein.

The I/O data port can be used to transfer information between the data processing system 405 and the downstream clippers or another computer system or a network (e.g., the Internet or Ethernet) or to other devices controlled by the processor. These components may be conventional components such as those used in many conventional data processing systems which may be configured in accordance with the present invention to operate as described herein.

Figure 11:
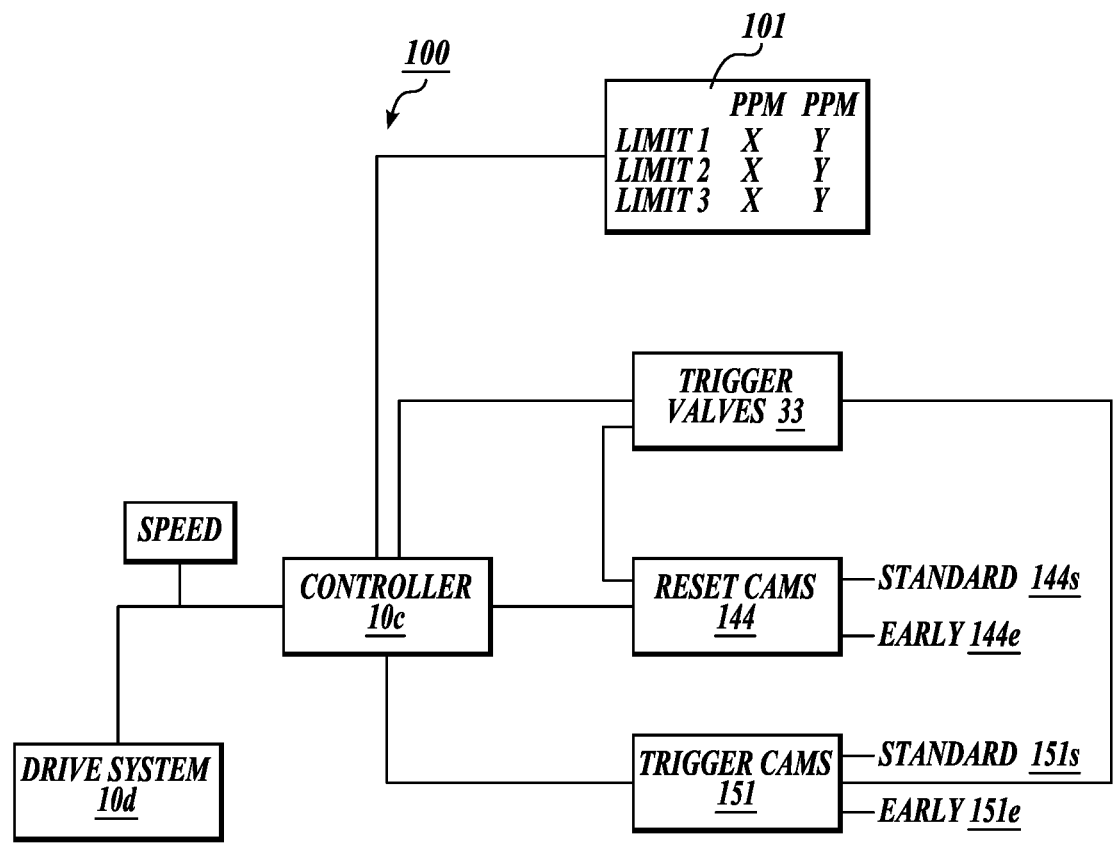
FIG. 11 is a block diagram of an exemplary control circuit for a packaging system according to embodiments of the present invention.

FIG. 11 illustrates an exemplary control circuit 100 for the packaging machine 10. The control circuit 100 includes at least one controller 10c that monitors speed of the drive system 10d. The control circuit 10c includes or is in communication with a module 101 that defines table rotational speed thresholds or limits, including at least limit 1 and limit 2, and typically greater than three, such as at least first, second and third limits in increasing speed values where limit 1<limit 2<limit 3, optionally correlated to a ppm or range of ppm production amounts. The controller 10c monitors speed of the drive system (rotational speed of the column or table) and selectively activates a trigger early cam 151e and/or a reset early cam and/or a reset extra early cam, 141e, 141ee, based on the rotational speed of the table 20, which causes the selectively activated cam or the standard cam to engage the pneumatic trigger valve 33.

While the present invention is illustrated, for example, with reference to particular divisions of programs, functions and memories, the present invention should not be construed as limited to such logical divisions. Thus, the present invention should not be construed as limited to the configuration of FIG. 10 but is intended to encompass any configuration capable of carrying out the operations described herein.

The block diagram and flow charts illustrate the architecture, functionality, and operation of possible implementations of embodiments of the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The embodiments of the invention in which an exclusive property or privilege is claimed are defined as follows:

1. A packaging system comprising:
    a rotatable table supported by a rotatable column;
    a plurality of circumferentially spaced apart clipper assemblies positioned at respective clipper stations at the rotatable table;
    a plurality of spaced apart pneumatic valves rotatable with the table in fluid communication with the clipper assemblies; and at least one of:
    (a) a clipper reset cam assembly having first and second reset cams that selectively automatically engage the pneumatic valves as the table rotates, wherein the first and second reset cams are reset standard and reset early cams, wherein the reset early cam initiates operation of the clipper earlier than the reset standard cam; or
    (b) a clipper trigger cam assembly having first and second trigger cams that selectively automatically engage the pneumatic valves as the table rotates, wherein the first and second trigger cams are trigger standard and trigger early cams, and the trigger early cam initiates a clipping cycle earlier than the trigger standard cam.

2. The system of claim 1, further comprising a sprocket with an inner perimeter and an outer perimeter, wherein the sprocket surrounding the rotatable column under the rotatable table, and wherein the plurality of spaced apart pneumatic valves are held by the sprocket.

3. The system of claim 1, wherein the system comprises the clipper reset cam assembly and the clipper trigger cam assembly, and wherein the system further comprises a sprocket with an outer perimeter, wherein the sprocket surrounding the rotatable column, wherein the plurality of spaced apart pneumatic valves are held by the sprocket, wherein the clipper reset cam assembly comprises at least one actuator that is linked to at least one of the first and second trigger cams, and wherein the at least one actuator resides outside the outer perimeter of the sprocket.

4. The system of claim 1, wherein the reset cams and/or the trigger cams are cam wheels with external circumferentially extending grooves holding at least one O-ring to protrude out of the groove.

5. The system of claim 4, wherein the cams wheels have an outer diameter of between 1 and 3 inches.

6. The system of claim 1, wherein the system comprises the clipper reset cam assembly and the clipper trigger cam assembly, and wherein the system further comprises:
    a sprocket attached to and surrounding the rotatable column, wherein the plurality of spaced apart pneumatic valves are held by the sprocket;
    a drive system to rotate the sprocket to in turn rotate the column and the table; and
    a control circuit in communication with the clipper trigger cam assembly and the clipper reset cam assembly, the control circuit configured to monitor rotation speed of the column, and selectively and automatically activate or deactivate (i) one of the first or second trigger cams and (ii) one of the first or second reset cams when the column has a speed above and below selected or defined speed thresholds.

7. The system of claim 1, wherein the system comprises the clipper reset cam assembly and the clipper trigger cam assembly, and wherein the system further comprises:
    a sprocket surrounding the rotatable column under the rotatable table top, wherein the plurality of spaced apart pneumatic valves are held by the sprocket;
    a drive system to direct the sprocket to rotate the column and the table top; and
    a control circuit in communication with the clipper trigger cam assembly and the clipper reset cam assembly, the control circuit configured to monitor rotational speed of the column, and wherein the control circuit directs the clipper assemblies to operate on a synchronized clipping cycle, wherein a clipping cycle includes automatically: (i) actuating a valve to a closed position using either a trigger standard cam or a selectively activating a trigger early cam, respectively corresponding to the first and second trigger cams; (ii) confirming if a voider plate is in position; (iii) if so, activating a punch controller to move a punch actuator to drive a punch downward to punch a clip over a target product at the clip die; (iv) directing a knife actuator to move a knife to cut a clipped package; and (v) actuating the valve using either a reset standard cam or a selectively activated reset early cam, respectively corresponding to the first and second reset cams, while retracting the knife actuator and the punch actuator.

8. A packaging system comprising:
a rotatable table supported by a rotatable column;
a plurality of circumferentially spaced apart clipper assemblies positioned at respective clipper stations at the rotatable table;
a plurality of spaced apart pneumatic valves rotatable with the table in fluid communication with the clipper assemblies; and at least one of:
(a) a clipper reset cam assembly having first and second reset cams that selectively automatically engage the pneumatic valves as the table rotates;
(b) a clipper trigger cam assembly having first and second trigger cams that selectively automatically engage the pneumatic valves as the table rotates;
wherein the first and second reset cams are reset standard and reset early cams, and wherein the reset early cam initiates operation of the clipper earlier than the reset standard cam.

9. A packaging system comprising:
a rotatable table supported by a rotatable column;
a plurality of circumferentially spaced apart clipper assemblies positioned at respective clipper stations at the rotatable table;
a plurality of spaced apart pneumatic valves rotatable with the table in fluid communication with the clipper assemblies; and at least one of:
(a) a clipper reset cam assembly having first and second reset cams that selectively automatically engage the pneumatic valves as the table rotates;
(b) a clipper trigger cam assembly having first and second trigger cams that selectively automatically engage the pneumatic valves as the table rotates;
wherein the clipper reset cam assembly further comprises a third reset cam[H]$_2$ and wherein the first reset cam is held at a forwardmost location relative to a rotational direction of the table and/or downstream of the second and third reset cams.

10. A packaging system comprising:
a rotatable table supported by a rotatable column;
a plurality of circumferentially spaced apart clipper assemblies positioned at respective clipper stations at the rotatable table;
a plurality of spaced apart pneumatic valves rotatable with the table in fluid communication with the clipper assemblies; and at least one of:
(a) a clipper reset cam assembly having first and second reset cams that selectively automatically engage the pneumatic valves as the table rotates;
(b) a clipper trigger cam assembly having first and second trigger cams that selectively automatically engage the pneumatic valves as the table rotates; and
wherein the system comprises the clipper reset cam assembly and the clipper trigger cam assembly, wherein the system further comprises a sprocket with an inner perimeter and an outer perimeter, wherein the sprocket surrounding the rotatable column under the rotatable table, wherein the plurality of spaced apart pneumatic valves are held by the sprocket, wherein the plurality of spaced apart pneumatic valves comprise a first actuator contact segment that faces outward and a second actuator contact segment that faces inward, wherein the clipper reset cam assembly positions the first and second reset cams toward the outer perimeter of the sprocket with at least a portion of the first and second reset cams extending a distance beyond the outer perimeter of the sprocket, and wherein the clipper trigger cam assembly positions the first and second trigger cams between the inner and outer perimeter of the sprocket, circumferentially offset from the reset cam assembly.

11. A packaging system comprising:
a rotatable table supported by a rotatable column;
a plurality of circumferentially spaced apart clipper assemblies positioned at respective clipper stations at the rotatable table;
a plurality of spaced apart pneumatic valves rotatable with the table in fluid communication with the clipper assemblies; and at least one of:
(a) a clipper reset cam assembly having first and second reset cams that selectively automatically engage the pneumatic valves as the table rotates;
(b) a clipper trigger cam assembly having first and second trigger cams that selectively automatically engage the pneumatic valves as the table rotates; and
wherein the system further comprises a sprocket with an inner perimeter and an outer perimeter, wherein the sprocket surrounding the rotatable column, wherein the plurality of spaced apart pneumatic valves are held by the sprocket, wherein the clipper trigger cam assembly comprises a proximity sensor and at least one actuator that is linked to at least one of the first and second trigger cams, and wherein the at least one actuator and the proximity sensor reside between the inner and outer perimeters of the sprocket.

\* \* \* \* \*

UNITED STATES PATENT AND TRADEMARK OFFICE
CERTIFICATE OF CORRECTION

PATENT NO.        : 10,889,399 B2
APPLICATION NO.   : 15/792977
DATED             : January 12, 2021
INVENTOR(S)       : May et al.

Page 1 of 1

It is certified that error appears in the above-identified patent and that said Letters Patent is hereby corrected as shown below:

In the Claims

Column 21 Line 34 "cam[H]$_2$ and" should read -- cam; and --

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*